United States Patent
Mason

(10) Patent No.: US 12,386,732 B2
(45) Date of Patent: Aug. 12, 2025

(54) SYSTEMS AND METHODS FOR CAPTURING TEST EXECUTION AND COMMUNICATION

(71) Applicant: Applause App Quality, Inc., Framingham, MA (US)

(72) Inventor: Robert S. Mason, Uxbridge, MA (US)

(73) Assignee: Applause App Quality, Inc., Framingham, MA (US)

( * ) Notice: Subject to any disclaimer, the term of this patent is extended or adjusted under 35 U.S.C. 154(b) by 66 days.

(21) Appl. No.: 18/081,852

(22) Filed: Dec. 15, 2022

(65) Prior Publication Data

US 2023/0130027 A1    Apr. 27, 2023

Related U.S. Application Data

(63) Continuation-in-part of application No. 17/678,324, filed on Feb. 23, 2022, now Pat. No. 12,093,166.

(Continued)

(51) Int. Cl.
G06F 11/3698    (2025.01)
G06F 11/3668    (2025.01)

(52) U.S. Cl.
CPC ...... *G06F 11/3698* (2025.01); *G06F 11/3684* (2013.01); *G06F 11/3688* (2013.01)

(58) Field of Classification Search
CPC .................. G06F 11/3684; G06F 11/3688

(Continued)

(56) References Cited

U.S. PATENT DOCUMENTS 8,230,267 B2    7/2012 Noller et al.
9,053,242 B2    6/2015 Smith et al.

(Continued)

FOREIGN PATENT DOCUMENTS

CN    107193734 A    9/2017
CN    109960642 A    7/2019

(Continued)

OTHER PUBLICATIONS

Satheesh, Arjun, and Monisha Singh. "Comparative study of open source automated web testing tools: Selenium and Sahi." Indian journal of science and technology 10.13 (2017).*

(Continued)

*Primary Examiner* — Francisco J Aponte
(74) *Attorney, Agent, or Firm* — Wolf, Greenfield & Sacks, P.C.

(57) ABSTRACT

A test automation system is provided that implements a DataTap service to capture underlying communications in a test environment or on a test platform. In some embodiments, the DataTap service can be configured as a passive data capture element. In various embodiments, passive data capture allows the system to record/mirror all data traffic flows associated with test execution without affecting the operation or execution of the tests. Some alternatives include functions to modify test traffic. In some examples, the system is configured to replay tests, modify test execution, modify test parameters, among other options. Various embodiments of the system allow new and updated feature sets to be integrated into existing test platforms without any changes in code, tests, or operation. Further, updates to test services become simple plug-in based features that, for example, provide assurance of zero impact on existing implementation.

19 Claims, 16 Drawing Sheets

Related U.S. Application Data

(60) Provisional application No. 63/290,807, filed on Dec. 17, 2021, provisional application No. 63/290,071, filed on Dec. 16, 2021, provisional application No. 63/153,042, filed on Feb. 24, 2021.

(58) Field of Classification Search
USPC .......................................................... 717/124
See application file for complete search history.

(56) References Cited

U.S. PATENT DOCUMENTS

| | | | |
|---|---|---|---|
| 9,069,904 B1* | 6/2015 | Cohen | G06F 11/3672 |
| 9,218,266 B2* | 12/2015 | Dhanapal | G06F 11/3698 |
| 9,563,544 B2 | 2/2017 | Mecke et al. | |
| 9,697,110 B1 | 7/2017 | Arkadyev | |
| 9,916,231 B2 | 3/2018 | Lundstrom | |
| 9,928,151 B1 | 3/2018 | Rodriguez Valadez et al. | |
| 10,149,189 B2 | 12/2018 | Ross | |
| 10,157,122 B1 | 12/2018 | Gohil et al. | |
| 10,169,189 B2 | 1/2019 | Ekambaram et al. | |
| 10,248,546 B2 | 4/2019 | Ekambaram et al. | |
| 10,305,758 B1 | 5/2019 | Bhide et al. | |
| 10,445,221 B2* | 10/2019 | Bromann | H04L 43/50 |
| 10,579,507 B1 | 3/2020 | Lounibos et al. | |
| 10,642,721 B2 | 5/2020 | Kulkarni et al. | |
| 10,776,252 B1 | 9/2020 | Weiss | |
| 10,846,208 B1* | 11/2020 | Lakshmi | H04W 4/24 |
| 10,853,232 B2 | 12/2020 | Henry et al. | |
| 10,860,461 B2 | 12/2020 | Mevorach et al. | |
| 11,023,363 B2 | 6/2021 | Lloyd et al. | |
| 11,042,472 B2* | 6/2021 | Vidal | G06F 11/3684 |
| 11,086,765 B2 | 8/2021 | Mukherjee | |
| 11,119,907 B1* | 9/2021 | Gopal | G06F 8/75 |
| 11,243,866 B1 | 2/2022 | Ramamoorthy et al. | |
| 11,288,177 B2 | 3/2022 | Balakrishnan et al. | |
| 11,327,875 B2 | 5/2022 | Poulin | |
| 11,416,377 B2* | 8/2022 | Bromann | G06F 11/3692 |
| 11,469,887 B1* | 10/2022 | Rubira Branco | H04L 9/3234 |
| 11,797,936 B1* | 10/2023 | Betgar | G06Q 10/103 |
| 11,874,931 B2* | 1/2024 | Bishop, III | G06F 11/3692 |
| 11,886,320 B2* | 1/2024 | Zhu | G06F 11/3636 |
| 2014/0132571 A1 | 5/2014 | Zeng et al. | |
| 2015/0074648 A1 | 3/2015 | Tal et al. | |
| 2015/0095890 A1 | 4/2015 | St. Clair et al. | |
| 2016/0026560 A1 | 1/2016 | Jackson et al. | |
| 2016/0044520 A1 | 2/2016 | Iyer et al. | |
| 2016/0378618 A1 | 12/2016 | Cmielowski et al. | |
| 2017/0220451 A1* | 8/2017 | Mankovskii | G06F 11/3648 |
| 2017/0262130 A1 | 9/2017 | Lloyd et al. | |
| 2017/0302559 A1* | 10/2017 | Chu | H04L 61/5007 |
| 2017/0329699 A1 | 11/2017 | Adinarayan et al. | |
| 2017/0337116 A1 | 11/2017 | Negara et al. | |
| 2018/0011780 A1* | 1/2018 | Aggarwal | G06F 11/36 |
| 2018/0084047 A1 | 3/2018 | Hao et al. | |
| 2018/0189170 A1 | 7/2018 | Dwarakanath et al. | |
| 2018/0196731 A1 | 7/2018 | Moorthi et al. | |
| 2018/0365133 A1 | 12/2018 | Mitchell et al. | |
| 2019/0294528 A1 | 9/2019 | Avisror et al. | |
| 2019/0340512 A1* | 11/2019 | Vidal | G06N 20/00 |
| 2020/0004665 A1* | 1/2020 | Shinge | G06F 11/2294 |
| 2020/0133829 A1 | 4/2020 | Zazo et al. | |
| 2020/0174917 A1 | 6/2020 | Patel et al. | |
| 2020/0379889 A1 | 12/2020 | Hamid | |
| 2021/0081308 A1 | 3/2021 | Golubev | |
| 2021/0089436 A1 | 3/2021 | Gangina | |
| 2021/0176155 A1* | 6/2021 | Awad | H04L 47/32 |
| 2021/0374033 A1 | 12/2021 | Yang et al. | |
| 2022/0100632 A1 | 3/2022 | Kulkarni et al. | |
| 2022/0138081 A1* | 5/2022 | Varma | G06F 11/3684 717/124 |
| 2022/0269586 A1 | 8/2022 | Zaleski et al. | |
| 2022/0342663 A1 | 10/2022 | Barkaee | |
| 2023/0011004 A1* | 1/2023 | Fellows | H04L 63/1416 |
| 2023/0025441 A1* | 1/2023 | Oguara | G06F 11/368 |
| 2023/0032088 A1* | 2/2023 | Goswami | G06F 8/65 |
| 2023/0318929 A1* | 10/2023 | Soosahabi | G06F 11/3688 709/224 |
| 2024/0054225 A1* | 2/2024 | Hu | H04L 63/1433 |

FOREIGN PATENT DOCUMENTS

| | | | | |
|---|---|---|---|---|
| CN | 112214404 A | | 1/2021 | |
| CN | 114416551 A | * | 4/2022 | |
| CN | 115577365 A | * | 1/2023 | |
| WO | WO-2024126442 A1 | * | 6/2024 | B61L 27/60 |

OTHER PUBLICATIONS

Majeed, Bismal, et al. "Comparative study of open source automation testing tools: Selenium, katalon studio & test project." 2021 International Conference on Innovative Computing (ICIC). IEEE, 2021.*

Khan, Muhammad Naeem Ahmed, et al. "A literature review on software testing techniques for smartphone applications." Engineering, Technology & Applied Science Research 10.6 (2020).*

Islam, Md Nurul, and Syed Mohammad Khurshaid Quadri. "Framework for automation of cloud-application testing using selenium (facts)." Adv Sci Technol Eng Syst J 5.1 (2020).*

Altaf, Insha, et al. "Survey on selenium tool in software testing." 2015 International Conference on Green Computing and Internet of Things (ICGCIoT). IEEE, 2015.*

* cited by examiner

Product with 5 Published TCs, 4 Executed for the build, of which 3 Passed, 1 Failed Regression:

1. Base score = 50

2. Poor Coverage = +4

3. Absolute Coverage (goal=46%): *(1+0.2*0.43)

4. Relative Coverage (product average=68%, STdev=18%): *1.000064

Adjusted Score = 59

FIG. 8

Product with 304 Published TCs, 175 Executed for the build, of which 167 Passed, 3 Failed Reg.:

1. Base score = 92

2. Poor Coverage = 0

3. Absolute Coverage (goal=12%): *(1+0.2*0.79)

4. Relative Coverage (product average=8%, STdev=10%) : *1.2

Adjusted Score = 100

FIG. 9

SYSTEMS AND METHODS FOR CAPTURING TEST EXECUTION AND COMMUNICATION

RELATED APPLICATION

This Application is a Continuation-in-part of U.S. application Ser. No. 17/678,324, filed Feb. 23, 2022, entitled "SYSTEMS AND METHODS FOR AUTOMATING TEST AND VALIDITY", which is a Non-Prov of Prov (35 USC 119 (e)) of U.S. Application Ser. No. 63/153,042, filed Feb. 24, 2021, entitled "SYSTEMS AND METHODS FOR AUTOMATING TEST AND VALIDITY". This Application is a Non-Prov of Prov (35 USC 119 (e)) of U.S. Application Ser. No. 63/290,807, filed Dec. 17, 2021, entitled "SYSTEM AND METHOD FOR TEST AUTOMATION". This Application is a Non-Prov of Prov (35 USC 119 (e)) of U.S. Application Ser. No. 63/290,071, filed Dec. 16, 2021, entitled "SYSTEMS AND METHODS FOR TEST AUTOMATION", each of which preceding applications are incorporated herein by reference in their entirety.

BACKGROUND

Testing automation provides options for improving code development and quality. Further test automation enables consistent and less complex testing frameworks, that can be analysis to evaluate coverage, penetration, and robustness. However many issues face the adoption and implementation of test automation. For example, typical test systems have been developed as custom platforms by various participants. These participants are reluctant, if not hostile, to adopt any automation functions that require changes to existing test frameworks. Even integration with test services that require minimal changes are rejected for the potential disruption to existing test frameworks.

SUMMARY

The inventor has realized that there is a need for an integration system configured to leverage existing test platforms and/or frameworks, that enables extension of those systems by new functions, features, services, and interfaces without disrupting or impacting existing architecture, test frameworks, and/or code. Accordingly, a test automation system is provided that implements a DataTap service to capture underlying communications in a test environment or on a test platform. In some embodiments, the DataTap service can be configured as a passive data capture element. In various embodiments, passive data capture allows the system to record/mirror all data traffic flows associated with test execution without affecting the operation or execution of the tests. Some alternatives include functions to modify test traffic. In some examples, the system is configured to replay tests, modify test execution, modify test parameters, among other options. Various embodiments of the system allow new and updated feature sets to be integrated into existing test platforms without any changes in code, tests, or operation. Further, updates to test services become simple plug-in based features that, for example, provide assurance of zero impact on existing implementation.

According to one aspect a system for test automation is provided. The system, comprises at least one processor operatively connected to a memory, the at least one processor when executing configured to execute an existing test framework between a test platform and at least a first test service. passively capture data traffic within and between the test platform and the at least the first test service mirror the captured data traffic to a proxy provider and automation platform, enable native functions of the automation platform to operate on the captured data traffic and manage a test framework native to the automation platform including the captured data traffic, the test framework including at least a plurality of executed tests, setup data required for the plurality of executed test, and the results of the plurality of executed tests.

According to one embodiment, the at least one processor is configured to validate a candidate test construct generates communication and execution stacks based on the passively captured data traffic upon execution. According to one embodiment, the at least one processor is configured to validate a candidate test construct does not induce any additional execution or communication beyond the passively captured data traffic responsive to execution of the candidate test construct. According to one embodiment, the at least one processor is configured to automatically construct additional test cases based on validated candidate test constructs and an additional test target. According to one embodiment, the at least one processor is configured to automatically generate automated test cases from manual execution test cases and manual execution test cases from automated test cases to extend testing coverage of the existing test framework.

According to one embodiment, the at least one processor is configured to instantiate a passive monitor in the test platform configured to capture execution stack information and communication stack information upon execution of the test framework. According to one embodiment, the passive monitor is configured to: record all communication information in the communication stack and associate the communication information to tests under execution. According to one embodiment, the passive monitor is configured to: record all execution information in the execution stack and associate the execution information to tests under execution. According to one embodiment, the passive monitor is configured to include operating system level interactions on the test platform during execution. According to one embodiment, the passive monitor is configured to mirror capture information to secure provider proxy. According to one embodiment, the passive monitor is configured to prevent any impact on the test platform in response to failure of the passive monitor.

According to one aspect a computer implement method for test automation is provided. The method, comprises executing, by at least one processor, an existing test framework between a test platform and at least a first test service, passively capturing, by the at least one processor, data traffic within and between the test platform and the at least the first test service, mirroring, by the at least one processor, the captured data traffic to a proxy provider and automation platform and enabling, by the at least one processor, native functions of the automation platform to operate on the captured data traffic and manage a test framework native to the automation platform including the captured data traffic, the test framework including at least a plurality of executed tests, setup data required for the plurality of executed test, and the results of the plurality of executed tests.

According to one embodiment, the method further comprises validating a candidate test construct generates communication and execution stacks based on the passively captured data traffic upon execution According to one embodiment, the method further comprises validating a candidate test construct does not induce any additional execution or communication beyond the passively captured data traffic responsive to execution of the candidate test construct. According to one embodiment, the method further comprises automatically constructing additional test cases based on validated candidate test constructs and an additional test target. According to one embodiment, the method further comprises automatically generating automated test cases from manual execution test cases and manual execution test cases from automated test cases to extend testing coverage of the existing test framework.

According to one embodiment, the method further comprises instantiating a passive monitor in the test platform configured to capture execution stack information and communication stack information upon execution of the test framework. According to one embodiment, the method further comprises recording, by the passive monitor, targeted communication information in the communication stack and associating the communication information to tests under execution. According to one embodiment, the method further comprises recording, by the passive monitor, targeted execution information in the execution stack and associating the execution information to tests under execution. According to one embodiment, the method further comprises preventing any impact on the test platform in response to failure of the passive monitor. According to one embodiment, the method further comprises analyzing the captured data traffic and test framework to determine a quality score for the test framework and identifying options for increasing the quality score.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any embodiment disclosed herein may be combined with any other embodiment in any manner consistent with at least one of the objectives, aims, and needs disclosed herein, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment. Various aspects, embodiments, and implementations discussed herein may include means for performing any of the recited features or functions.

BRIEF DESCRIPTION OF THE FIGURES

Various aspects of at least one example are discussed below with reference to the accompanying figures, which are not intended to be drawn to scale. The figures are included to provide an illustration and a further understanding of the various aspects and examples, and are incorporated in and constitute a part of this specification, but are not intended as a definition of the limits of a particular example. The drawings, together with the remainder of the specification, serve to explain principles and operations of the described and claimed aspects and examples. In the figures, each identical or nearly identical component that is illustrated in various figures is represented by a like numeral. For purposes of clarity, not every component may be labeled in every figure. In the figures:

FIG. 8 is an example process for calculation of a sub-score, according to one embodiment;

FIG. 9 is an example process for calculation of a sub-score, according to one embodiment;

DETAILED DESCRIPTION

According to some aspects an automation test system and method is provided. The Automation test system is configured to extend existing test frameworks and/or test platforms while having zero impact. Various embodiments use a passive communication component that is configured to mirror all data flows associated with test execution to a proxy service that is connected to an extended or new test automation and/or management platform. Any and all of the features of the automation platform become fully integrated and can be used to deliver quality scoring, recommendations, and updates to existing test frameworks. Further embodiments allow the system to provide additional services and/or extension of features via the DataTap and proxy service without impacting or affecting underlying operation.

Examples of the methods, devices, and systems discussed herein are not limited in application to the details of construction and the arrangement of components set forth in the following description or illustrated in the accompanying drawings. The methods and systems are capable of implementation in other embodiments and of being practiced or of being conducted in various ways. Examples of specific implementations are provided herein for illustrative purposes only and are not intended to be limiting. In particular, acts, components, elements, and features discussed in connection with any one or more examples are not intended to be excluded from a similar role in any other examples.

Figure 1:
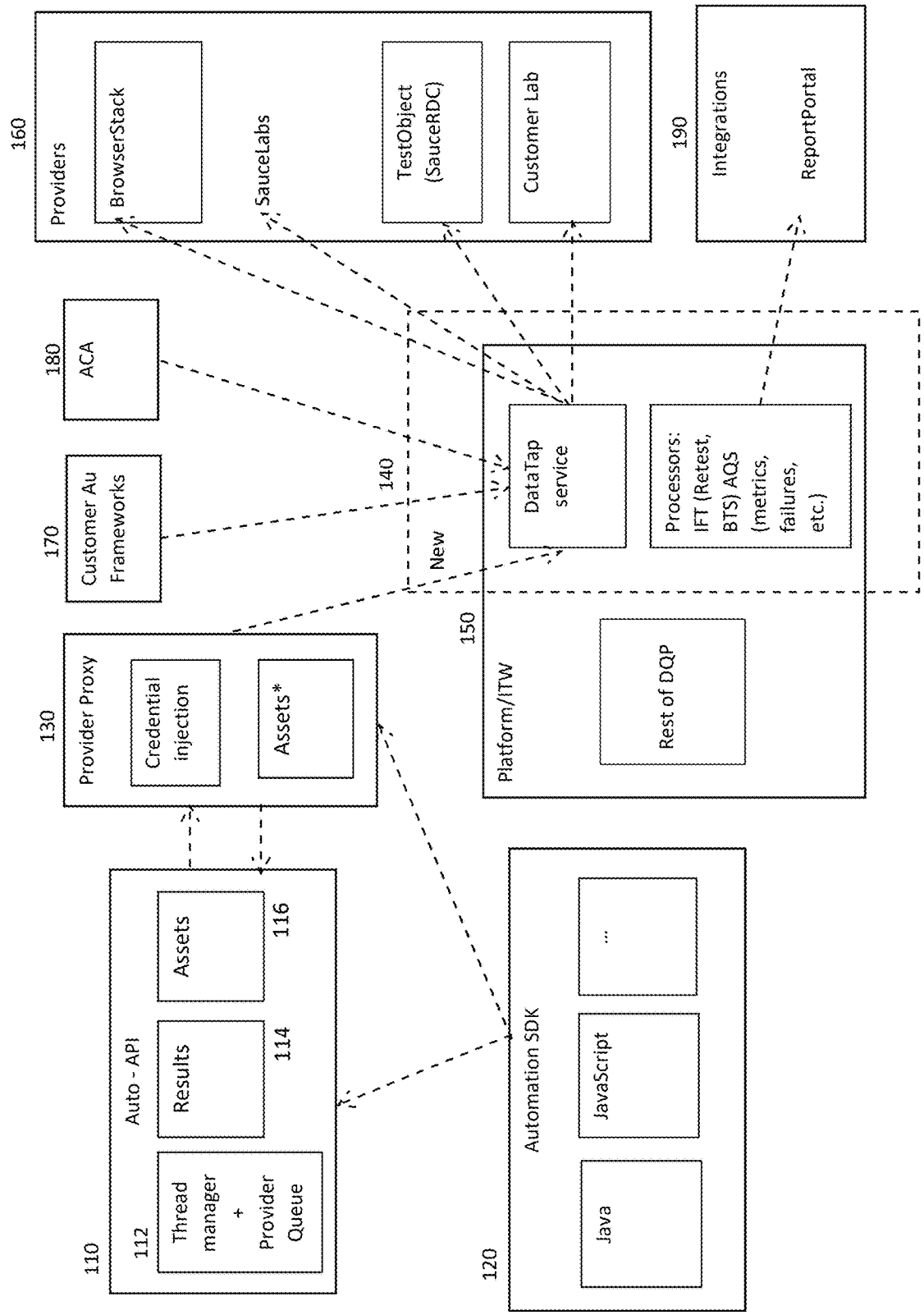
FIG. 1 is block diagram of an example system, according to one embodiment.

FIG. 1 illustrates an example implementation. Shown on the left side of the block diagram are elements highlighting an automation framework solution (e.g., 110 and 112). The automation framework provides any number of automatic test functions and augmentation. The automation framework solution can be connected to client testing services and/or systems as shown at 120 and 140. The framework may also include embodiments and functionality to score testing framework and/or generate codeless test implementation, described in greater detail below In various embodiments, a provider proxy 130 is configured to communicate with a DataTap service 140 installed on client systems and link automation systems to enable construction of a complete testing framework that is secure and enables consistent operation across many test platforms. In various embodiments, the DataTap service can be used to extend existing testing solution to include additional testing platform and/or functions. In further embodiments, the DataTap service enables porting or seamless transitions from one testing platform to another, and in still others yields a combined testing platform.

According to various embodiments, the architecture is configured to expand client testing functions, without subjecting the client systems to security leaks and/or to eliminate any need to have a divergent test code base from production code bases. The inventor has realized that conventional approaches that link client code management systems and automation test services often require different code implementation for the test environment. Although required changes may be small, any difference between tested code and production code can lead to points of failure and/or unexpected results or performance. Thus, various embodiments are tailored to improve testing and production integration over many known conventional systems, and resolve adoption issues that are present with many conventional approaches.

In still other embodiments, the DataTap service 140 can be configured to operate as a passive component. For example, the DataTap service is configured to monitor and pass communication from an installed platform 150 that hosts a client's testing functions and testing services without affecting the execution of the tests and/or data communication to external services/systems, etc. In some embodiments, the DataTap service 140 can operate in a security sandbox such that the operator of the platform can guaranty that the DataTap service 140 does not affect any test operations or data flow on platform 150 (e.g., an in the wild test platform ("ITW").

The configurations for the DataTap service can be tailored to an implementation environment. Example configuration settings include options specific to a testing service being employed (e.g., SauceLabs), provider url, any authentication settings required, settings for communication stack monitors, including, for example, OS, OSversion, local services, etc., as well as setting for applications used. including for example browser specific setting, which can be specified by browser name and/or version. One example of setting include the following:

```
{
    "applause:options": {
        "providerUrl","https//:automation_stage:abcdefg@ondemand.us-west-
        1.saucelabs.com/wd/hub",
        "apiKey", "abcdefg-1234"
    },
    "bstack:options":{
        "osVersion": "Monterey",
        "os": "OS X",
        "local": "false"
    },
    "browserName": "Chrome",
    "browserVersion": "latest"
}
```

30

In some embodiments, the DataTap service 140 is configured to capture communication between a client platform 150 and any connected test system/service. For example, shown at 160 any number of test providers (e.g., BrowserStack, SauceLabs, CustomerLab, TestObject(SauceRDC), etc.) can be in communication with the platform 150. According to some embodiments, the system incorporates such providers for their ability to provide test targets. For example, the providers supply browsers or mobile devices to be tested under automation. In other embodiments, the system can leverage any test intelligence enabled by the providers. For example, the providers may offer testing services and communicate with a client or test platform to enable test management (e.g., bug tracking, automation, test management/control, etc.), test execution, and can also provide version control services, among other options. In some embodiments, the system includes test case management functions, bug tracking etc., and can capture additional test information from provider data or services on the same. In one example, the system is configured to rely on native functions for test management, and leverage the providers for additional test targets.

According to various embodiments, any communication between the providers, services, and the platform can be captured by the DataTap service 140. In some embodiments, the platform 150 can also be configured to communicate with client custom automation frameworks, services, and/or functions (e.g., 170) or codeless automation services (e.g., 180—APPLAUSE codeless automation ("ACA")—some examples are described below). The DataTap service 140 can be configured to capture any communication to facilitate integration of automation functions, which can include test improvement recommendations, and can also include automatic re-execution of tests, among other options.

In further embodiments, the known ReportPortal service (e.g., 190) can also be integrated with a test platform 150, and the ReportPortal service can be configured to capture and display test results via integration with the platform and the connected services (e.g., 160). The data flows from the connected services (e.g., 160), custom frameworks (e.g., 170), external frameworks (e.g., 180), and ReportPortal (e.g., 190) can all be captured by the DataTap service and be communicated to a provider proxy 130.

According to some aspects, the DataTap 140 and provider proxy 130 are configured to operate between existing automation solutions and associated providers so that the common thread in all automation is that whatever execution is occurring as part of testing, the test, input data, results, intermediates, and ultimate outputs are captured and available for analysis through the provider proxy without impacting the underlying execution. Further, the illustrated architecture extends the automation analysis without affecting any existing architecture, code, tests, and/or communication flows. For example, test automation can be run on real world devices to ensure quality control and/or consistent operation. Extending test services in this environment is fraught with creating new interactions, unexpected interactions with existing test suites and/or services and the devices being tested. These issues are exacerbated in conventional systems and approaches. For example, a conventional approach would port existing test cases/suites/frameworks to a new platform, and resolve any configuration issue ad hoc. Such an approach is rife with error, and is likely to introduce unintended interaction or effects as part of configuration changes and/or error resolution. In other examples, test engineers are forced to recreate test cases/suites/frameworks using an existing platform as a roadmap. Conventional approaches to re-code even a test case often results in coding errors and execution errors, that are not always apparent to the developer even when supervising execution.

According to one aspect, the architecture shown enables harmonization of existing client test solutions, provider based test services, and system augmentation that is scalable and extensible without compromising existing test operation. For example, the DataTap can be configured to operate as a network proxy that delivers all network communication both to the intended target and a duplicate communication stream to the provider proxy 130. In one example, the duplicate stream enables observation of all network traffic while doing no harm to exiting communication pathways. Various embodiments are configured to capture all exiting test framework communication, data, and knowledge without detrimental effect.

According to various embodiments, the system is configured to map captured traffic into test case templates, and automatically construct test cases, suites, etc., based on the captured traffic. In further embodiments, the DataTap proxy is configured to determine execution environments for respective cases and map further test execution to the detected environment. For example, test execution can be made against specific test environments, which include software based parameters (e.g., app version, OS, extensions, etc.), hardware based parameters (e.g., mobile, desktop, processor, RAM, mobile version, mobile capability, etc.). The system can determine the execution environment and specify further execution occur against the detected environment. Additional embodiment can be configured to build new execution environments for test cases based on a detected environment to improve test penetration and coverage. Other embodiments, enable replay of the test execution on various test environments, among other options. According to another embodiment, the automation test system can be configured to build containers for test cases based on capture execution traffic the ensure compatibility and execution without error or introduction of unintended effects. For example, test case commands, requests, operations, etc., can be identified that are incompatible or would need to be rewritten on a target test automation implementation. Rather than re-code, or re-develop, the automation system can provide an execution wrapper to accept a test command and translate to low level communication compatible with a new system, or translate the request into a compatible request.

According to some embodiments, the system includes a network proxy that targets specific communication and/or layer(s) of the network stack. For example, the network proxy can be configured to target, Appium and Selenium automation traffic, which enables the system to know and understand more than just packets going back and forth. According to one embodiment, the system is configured to understand what is being done from an automation perspective based on the traffic communicated. In some examples, the feeds from the DataTap are targeted at the automation level and not just on raw network traffic. Although conventional network proxies are available, proxy services that are configured to identify, understand, and redirect automation traffic are not. For example, simply capturing traffic does not yield the specification required to map an observed execution into new test cases, suites, etc. Thus, the system is configured to capture, analyze, and map test executions to ensure error free capture and reconstruction. In some embodiments, the targeting on automation traffic can be done on other components so that the proxy is configured to capture enough low level traffic to ensure automation data flows are captured/analyzed.

For example, when a customer configures DataTap, the user accesses the system to add a customer identifier (API key), that enables the system to identify, track, and manage the entity using the DataTap functionality. According to one embodiment, the system is configured to inject the key into the Selenium traffic as a named capability that can be extracted by the system later for mapping to the customer. In some embodiments, the system is configured to identify captured traffic origin (e.g., as Selenium based traffic), and the system can identify looks for a client/user key embedded for mapping purposes. In further example, the system can identify type of execution based on analyzing the traffic, classify tests based on analyzing the traffic, among other options.

This can be especially challenging where multiple system and multiple providers are participating in a test execution, and is an area where conventional approaches fail. The DataTap functionality captures various levels of automation traffic and validates capture of complete data flows. The functionality is configured to identify, understand, and provide redirection of various traffic flows as needed to enable use of, porting, or redevelopment of any test case, suite, and/or framework. In some examples, the captured data flows can be used to ensure execution of new/reconstructed test cases match without additional requests, communication, or process flow. In still other examples, the system can identify a test execution format (e.g., Selenium, Appium, etc.) and use the identification to tailor data flow traffic capture. In various examples, Selenium defines events as part of its communication/execution protocol, and the system is configured with the capability to identify all defined events.

According to one embodiment, the system can be configured to use an original communication flow to evaluate a reconstructed test case. For example, the system can identify any difference in ordering of the flow and modify the underlying test case to resolve (even automatically). In another example, additional communication beyond the original flow can be identified, and the underlying test case/test commands can be modified until additional communications are eliminated. Such evaluation/validation can be ongoing so that new test data or environments can be evaluated to ensure no changes or interactions were the result of reconstruction of the test case. In still other embodiments, models of the original test case and execution can be maintained by the system to provide further assurance that new data or new test environments would have resulted in the same operations for a reconstructed test case under the same parameters. Such models may be archived to reduce computational burdens and activate for validation if new behavior is observed under new data or environment conditions, reducing the burden on the system relative to other approaches.

In further embodiments, the DataTap proxy can be used to evaluate new or extensions of prior test cases. For example, the system can evaluate a test suite and identify areas to expand testing coverage, integration, etc. The system can automatically build new cases and back convert into the environment in which the DataTap service is executing to evaluate the new cases and behavior under the original environment constraints. Validating test case behavior and communication and execution stacks in both environments improves the accuracy of the subsequent testing, and improves over many conventional approaches.

In further embodiments, the provider proxy links a client test platform to automation application programming interfaces (e.g., 110) that can include thread manager and provider queues (e.g., 112) for test processing, creation, management, extension, etc., as well as functions to compile information on test results (e.g., 114) and on test assets under observation (e.g., 116). In some examples, the DataTap enables analytics on existing test operations, and extension of those test operations into new functions. For example, the automation API 110 and automation SDK 120 are configured to associate the automated tests being executed, and link quality scores to the test suite being executed. In further example, the automation components (e.g., 110 and 120) are configured to score current test frameworks being executed on existing test systems, and generate recommendations for improving existing test protocols, test suites, etc. In other examples, the automation components and codeless automation components can operate synergistically to turn quality scores and/or testing scores, and any recommendations into automatically generated improvements to existing test protocols/suites. Further examples include automatically triggering re-tests on existing test cases and/or updating test cases for re-execution. In another example, the automation components are configured to support community based integration into test management.

According to some embodiments, community integration enables the system to automatically hand the test cases, suites, and/or protocols to the community environment to retest, evaluate, and/or update. In this architecture, the DataTap component enables capture of various test execution and seamless integration of community test functions. In some embodiments, the integration occurs via a passive data collection component, limiting and even eliminating, impact on the underlying test execution and security issues.

According to other aspects, the system is configured to extend options and management of day-to-day test execution. In some embodiments, the system captures and distills various disparate test services/systems to enable targeted insights and focused analysis of test triaging. In some examples, the system enables users to visualize test results and the underlying tests over an expanded framework. In some embodiments, the system enables users to identify failed tests, potential affiliated product failure/issues, and confirm or resolve any issues with large crowd based analysis to improve or identify solutions.

In some embodiments, the automation system is configured to analyze existing test cases, suites, and/or execution to automatically identify options for improvements in testing. In some examples, the system identifies areas of potential issue and automatically invokes community functions. In some settings, the system can be configured to highlight test executions for referral to a test community. In one example, the system can introduce user interface functions to trigger community functions as part of analysis of existing test suites. Dynamically updating the user interface to introduce community functions resolves many issues with various conventional approaches, including failure to leverage community review and functions. In other examples, dynamic user interface updates improve system efficiency over conventional approaches, among other options.

In further embodiments, the provider proxy 130 can be configured with functions for credential injection and test asset definition that facilitate testing and analysis. In some embodiments, the system can identify options for leveraging additional testing systems/services that enable improved scoring of exiting test suites or allow creation of an improved test framework. The provider proxy can include functions to manage introduction of new services, and manage security settings of those services, among other options.

According to one embodiment, the system enables automated testing services as a plug-in to existing systems to develop and extend a testing platform. In some embodiments, the system is configured to analyze current test system/service holistically to identify additional services that can be integrated or used to augment a test framework. In some examples, the system can provide estimates on test quality scoring based on candidate changes and highlight potential increases in test quality scoring. In other examples, the system can integrate executable functions into displayed user interfaces to trigger candidate options (e.g., community functions, provider add-in services, codeless automation integration, etc.).

Figure 2:
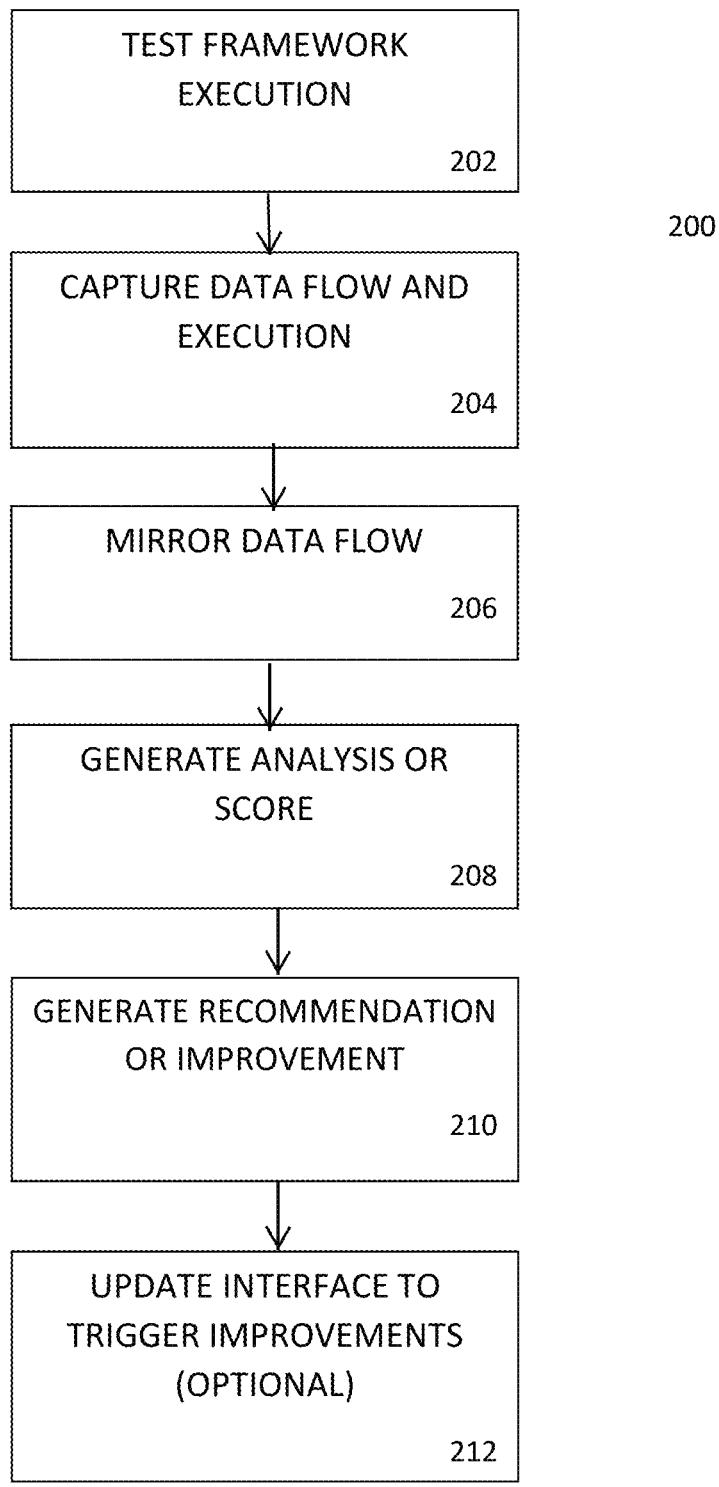
FIG. 2 is an example process flow, according to one embodiment.

Shown in FIG. 2 is an example process flow 200. Process 200 can begin with testing framework execution at 202. Any number of tests, test suites, test services and/or test platform can be invoked as part of test framework execution at 202. Process 200 continues at 204 with capture of the data flows and test execution. In some embodiments, a DataTap service and/or component can be executed to manage capture of the data flow and any information exchanged during test execution. In other embodiments, a communication layer can be executed through which all communication will pass. In various examples, the specific architecture can vary so long as an element of the system is configured to capture the data flows and results from executing the test framework.

According to one embodiment process 200 can continue at 206 with mirroring of the data flows associated with testing. In one embodiment the mirrored data flows are sent for processing and analysis. At 208, a score of the data can be generated or other analysis can be performed on the test framework, test architecture and/or other aspect of the existing test platform. In some embodiments, process 200 continues with generation of recommendations on improvements at 210. According to one example recommendations can be provided based on the opportunity to increase the quality score for current testing. Various recommendations can be provided, including, integration of the new test platform, updating of an existing test suite/framework, referral to community evaluation and/or updating, among other options.

According to some embodiments, process 200 may optionally continue with updates to the user interface that are configured to execute the candidate improvements at 212. In some examples, an end user is given the option to execute the suggested improvement via system generated user interface elements. In one example, the user interface element includes basic definitions and/or metadata to enable the underlying improvement (e.g., addition of new service/platform, updating integration and/or report integration, retest, community integration services, among other options).

According to various embodiments, process 200 is shown is an example execution, and it should be understood that various steps shown in process 200 may be omitted, combined, and/or executed in other order.

Various embodiments extend the functionality discussed above to include further optimizations, that can be provided alone or in combination with the features and embodiments discussed above. For example, it is realized that tailoring test execution to specific environments improves overall testing. Thus various embodiments are configured to manage linking captured data flow to specific environment mappings. Further embodiments manage creation of test runs into logically organized test cycles. The system can be configured to identify environment mappings and group test case runs into common environments to improve execution efficiency. Stated generally, as test cases are executed (manually or via automation) the cases are executed against one or more defined environments. For example, the customer may have 1,000 test cases for the iOS platform and wants to execute them against iPhone 10, 11, 12, 13, 14 and iOS versions 12, 13, 14. A single test run may have multiple environments but each environment is linked to and has a collection test cases executed against it. Various embodiments are configured to match environments defined in the original test case management system to a new test platform. According to various embodiments, this organization and matching represents functionality unavailable in other systems.

Additionally, the system is configured to provide this functionality even where the environment linkage is not defined or specified in the original environment. In some embodiments, the system is configured to generate environment linkages based on fuzzy logic. For example, the fuzzy logic analysis can determine that even though the environment selection defined via Appium or Selenium communication flows passed to the device providers for testing do not match up (e.g., based on variances in OS versioning, device naming, etc.), identified attributes within the capture data provide enough similarity for a match. In some embodiments, the system is configured to capture and analyze environment based attributes of a given test execution, and identify attributes that link or specify defined environments in the test case management system.

To illustrate with an example, an iPhone 14 with OS version 16.1 may be specified but the particular device available may be version 16.1.1. According to one embodiment, the matching executed by the system can consider only the major version number when determining a match. In other examples, the system can be configured to consider the major and minor or all significant digits in the version number when matching environments.

In further embodiments, identification of those attributes is used to generate a probability of a match, and if a threshold match score is satisfied, the system is configured to capture the association to that test environment. In some embodiments, the system can be configured to determine a best match, that is if multiple environments match, the one with the highest score is selected.

Organizing Test Data Examples

According to one aspect, the DataTap functionality is configured to capture massive amounts of execution/communication traffic. In further aspects, the system is configured to manage the volume of traffic by detecting and mapping that traffic to new test cycles (e.g., where a test cycle can represent an overall release of software, product, app, etc.) and new test run (e.g., one or more iterations of a series of test cases for one or more environments) organizations. In various embodiments, the system is configured to analyze the data flows/captured traffic to differentiate and organize various test executions into those that are multiple runs of the same test cycle versus an execution of a new test cycle. In some examples, the system is configured to analyze traffic characteristics to from the capture data whether traffic is from a new test cycle vs a new test run. Examples characteristics that the system analyzes include version or build information of the system under test (SUT), as the system can identify changes in version or build and infer a change of test cycle. In further example, the system is configured to determine that a detected change in version or build information indicates a new test cycle as that data is not likely to change during a test run. In further example, timing is used as a factor in differentiating test cycles and test runs. According to one example, the system is configured to determine that test runs for the same test cycle happen within a similar time range vs test runs for another test cycle. According to one example, the system is configured to determine for customers executing test cycles no more often than once a day, a 23 hour period for collapsing test runs into the same test cycle can be used. The system can also be configured to leverage user annotation of the test runs as they trigger them, which enables the system to directly associate test runs to a test cycle based on the annotations.

While the timing analysis is dependent on the frequency of automation test runs, the system is configured to analyze frequency of execution as part of timing analysis. Some embodiments are configured to use large time periods to eliminate classification errors, as it follows when analyzing test execution on weekly or monthly releases there are large periods between batches of test runs. In further examples, the system leverages the realization that mobile automation generally lends itself better to the time based approach due to the overhead around new releases. Other embodiments, employ additional attributes to improve the determination of whether currently observed test execution is a new test cycle vs a new test run. Data tracking and historical analysis can be used to adjust the attributes used as well as to create, update, and/or modify weighting of the attributes used.

Test Case Mapping Examples

As a transparent automation proxy to detect automation runs and traffic one of the primary goals for DataTap embodiments is ensure that no changes to the automated tests occur. As automated tests execute, the system is configured to map back to test cases defined in the test case management system for reporting, analysis, triage, etc. In order to ensure this functionality, the system can be configured to generate and maintain an association between a programmed test case in an automation test system and a written test case in the test case management system. Various embodiments include a number of approaches to ensure the associated is generated correctly and maintained. According to one example, the system employs a fuzzy matching algorithm that links an automation test name (class/function/method name, descriptive text) to the test case name in the test case management system by best match (e.g., highest likelihood). It is realized that in execution, the success of the fuzzy matching algorithm can depend on a similarity between the test case names in the two systems. Thus, the fuzzy matching algorithm can permit close or high probability associations. In further embodiments, the system can use other attributes (e.g., matching test targets, matching test data, etc. to improve the likelihood of a fuzzy match determination).

For example, the system can identify a "Test Login as Accounting User" for a test case name whereas a test may be called "testLoginAsAccountingUser" or "test_login_as_accounting_user" or other variations. The system can determine a match based on similarity or other distance measures. In other examples, the system can be configured to determine a match based on upper/lower case insensitivity, tokenization, etc.

According to another example, the system is configured to provide for direct linking by annotating a test case in the automation system with a test case ID (unique identifier) from the test case management system, but the annotation approach to function optimally would require annotation of all the existing test cases. In some examples, the system can be configured to create an annotation automatically or as an automatic suggestion that can be confirmed by a user. In another example approach, the system is configured to change a test case name in either the test case management system, the automation system, or both in such a way that the fuzzy match is assured, possible/likely. By ensuring the association between automation tests executed and test cases written in the test case management system, manual re-runs of failed automation tests, percentage completion of test suite runs, test analytics, can employ the full test data provided.

To provide an example the following trace log is provided

```
{
  "desiredCapabilities":{
    "applause:options":{
      "apiKey":"abcde-12345",
      "factoryKey":"WebDesktop",
      "provider":"SauceLabs US West",
```

-continued

```
      "driverName":"Chrome",
      "driverOs":"Windows",
      "testCaseName":"65",
      "testCycleId":11111,
      "driverType":"Browser",
      "providerUrl":"https://zyxwv-54321@ondemand.us-west-1.saucelabs.com:443/wd/hub"
    },
    "newCommandTimeout":3000,
    "commandTimeout":600,
    "idleTimeout":1000,
    "browserName":"chrome",
    "sauce:options":{
    }
  },
  "capabilities":{
    "firstMatch":[
      {
        "applause:options":{
          "apiKey":"abcde-12345",
          "factoryKey":"WebDesktop",
          "provider":"SauceLabs US West",
          "driverName":"Chrome",
          "driverOs":"Windows",
          "testCaseName":"65",
          "testCycleId":105,
          "driverType":"Browser",
          "providerUrl":"https://zyxwv-54321@ondemand.us-west-1.saucelabs.com:443/wd/hub"
        },
        "browserName":"chrome",
        "sauce:options":{
        }
      }
    ]
  }
}
``` response from provider (the system is configured to parse, for example, the device details and session id out of this):

```
{
  "value":{
    "sessionId":"somesessionistring",
    "webdriver.remote.sessionid":"somesessionistring",
    "hasMetadata":true,
    "capabilities":{
      "goog:chromeOptions":{
        "debuggerAddress":"localhost:49212"
      },
      "browserVersion":"107.0.5304.63",
      "timeouts":{
        "pageLoad":300000,
        "implicit":0,
        "script":30000
      },
      "strictFileInteractability":false,
      "acceptInsecureCerts":false,
      "webauthn:virtualAuthenticators":true,
      "networkConnectionEnabled":false,
```

```
"chrome":{
    "chromedriverVersion":"107.0.5304.62
    (1eec40d3a5764881c92085aaee66d25075c159aa-refs/branch
    heads/5304@{#942})",
    "userDataDir":"C:\\Users\\SomeUser\\AppData\\Local\\Temp\\scoped_dir964_142
    5330531"
},
"browserName":"chrome",
"setWindowRect":true,
"proxy":{
},
"pageLoadStrategy":"normal",
"webauthn:extension:largeBlob":true,
"platformName":"windows",
"unhandledPromptBehavior":"dismiss and notify",
"webauthn:extension:credBlob":true
    }
  }
}
```

In some examples, the testCaseName can be sent as a separate command instead of in the capabilities. Example options include:

```
applause_executor: {
    "command": "setTestCaseName",
    "arguments": {
        "name": "CASE_NAME"
    }
}
browserstack_executor: {
    "action": "setSessionName",
    "arguments": {
        "name": "CASE_NAME"
    }
}
sauce:job-name=CASE_NAME
```

In further example, the system is configured to send status as a command:

```
applause_executor: {
    "command": "setTestStatus",
    "arguments": {
        "status":"<passed/failed>"
        "reason": "<reason>"
    }
}
browserstack_executor: {
    "action": "setSessionStatus",
    "arguments": {
        "status":"<passed/failed>",
        "reason": "<reason>"
    }
}
sauce:job-result=passed
```

Figure 3:
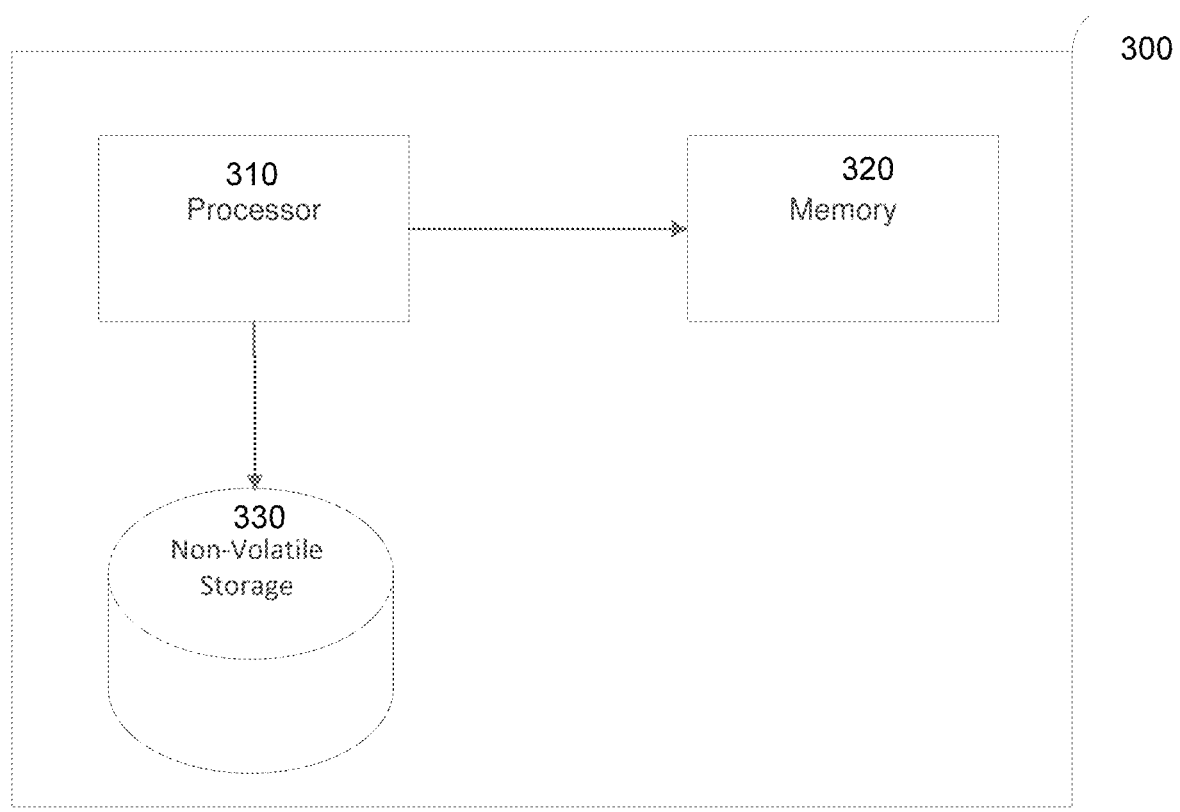
FIG. 3 is a block diagram of an example computer system improved by implementation of the functions, operations, and/or architectures described herein.

FIG. 3 is a block diagram of an example computer system that is improved by implementing the functions, operations, and/or architectures described herein. Modifications and variations of the discussed embodiments will be apparent to those of ordinary skill in the art and all such modifications and variations are included within the scope of the appended claims. Additionally, an illustrative implementation of a computer system 300 that may be used in connection with any of the embodiments of the disclosure provided herein is shown in FIG. 3. The computer system 300 may include one or more processors 310 and one or more articles of manufacture that comprise non-transitory computer-readable storage media (e.g., memory 320 and one or more non-volatile storage media 330). The processor 310 may control writing data to and reading data from the memory 320 and the non-volatile storage device 330 in any suitable manner. To perform any of the functionality described herein (e.g., image reconstruction, anomaly detection, etc.), the processor 310 may execute one or more processor-executable instructions stored in one or more non-transitory computer-readable storage media (e.g., the memory 320), which may serve as non-transitory computer-readable storage media storing processor-executable instructions for execution by the processor 310.

Quality Score Implementation Examples

Various embodiments integrate a determination of "release readiness" using factors that impact the decision-making process to release (or not release) software. The factors can include release standards (e.g., organizational, standard bodies, etc.), and in some examples can include tunable factors that enable various users to be more risk-averse or risk-tolerant than others when making a software release decision. Other factors that the system can evaluate and report on can include a user's testing maturity, testing penetration, integration into new testing platforms/modalities, and/or prior experience testing the same product, similarity to prior code, etc.

According to one embodiment, the assessment system is configured to generate a value based on testing results and analysis of a multitude of factors that impact a readiness evaluation. For example, the system generates a software quality score (e.g., an Applause Quality Score "AQS") that enables development teams to understand the level of quality they are achieving for a given release and build-over-build. In various examples, the system generates a data-driven score to enable development teams or quality assurance teams to make decisions for when a build is ready for release. In further embodiments, the system can integrate user interfaces that present a software quality score in a user dashboard that is linked to version control systems. On review and acceptance of the score, a user can trigger the release of their new code or product. Various embodiments implement test quality scoring to identify areas on which to improve testing and/or quantitively confirm a testing framework.

Figure 4:
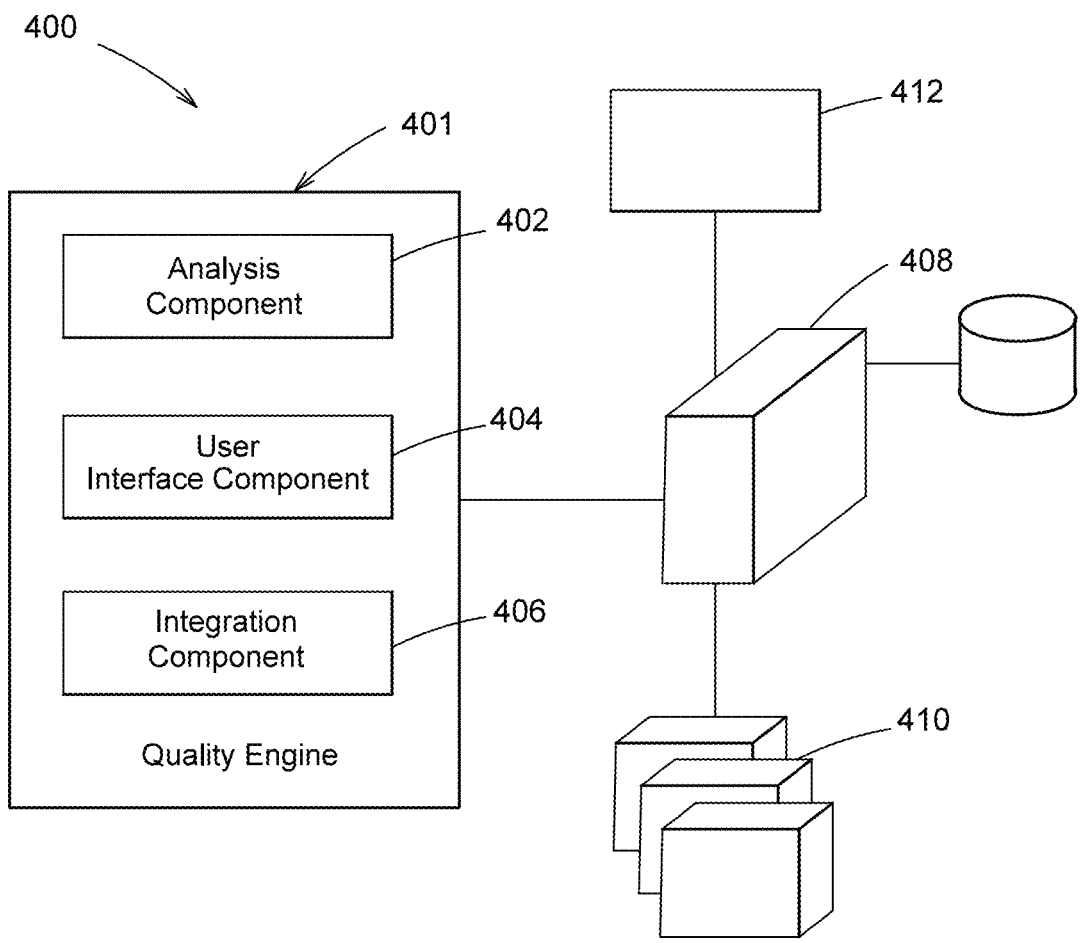
FIG. 4 shows example screen captures and editing functionality, according to one embodiment.

FIG. 4 is a block diagram of an example assessment system 400 configured to analyze testing data, software management, software development, and/or version control data, among other options to generate a readiness evaluation for a given product, code release, etc. The system 400 can include a variety of components that each execute respective functions and/or perform operations to generate the readiness evaluation and respective displays. According to some embodiments, the system can include a quality engine 401 configured to instantiate respective components on the system to perform described functions, algorithms, and/or operations. In other embodiments, the system 400 and/or engine 401 can be configured to perform the discussed functions without instantiating specific components.

According to one embodiment, the system 400 and/or engine 401 includes an analysis component configured to analyze testing data, software management, software development, and/or version control data (among other options) to generate a quality score that reflects a readiness evaluation for a given product, code release, etc.

According to one embodiment, the system generates and displays an Applause Quality Score "AQS" rating that is a calculated value ranging from 0 to 100. For example, the AQS describes the quality of testing results for a product or build during one or more test cycles. In some embodiments, the system captures and analyzes the results from any testing done and provides contextual visualization of the quality and reliability of testing/results collected. Broadly stated, the AQS rating is akin to a credit scored for software quality. Similar to a credit score, the AQS rating is configured to consider several factors (e.g., of varying importance and/or tunable importance). In a similar manner as a credit score where credit history length, number of on-time payments, and credit utilization each factor into the output value, the system is configured to capture information on testing history/experience, similar software/code releases, similar code development, prior release history/experience, current testing performed, identified bugs, weighted valuation of bug severity, resolved bugs/issues, weighted valuation of resolve bug/issue severity, historic performance for bug/issue resolution, etc. The system can then analyze and/or weight the captured information to produce a single number that represents the software quality/readiness of a given release or product, among other options.

Various examples and embodiment are disclosed in U.S. application Ser. No. 17/237,540, filed Apr. 22, 2021, entitled "SYSTEMS AND METHOD FOR ANALYZING SOFTWARE AND TESTING INTEGRATION," which is incorporated by reference in its entirety.

According to various embodiments, a quality analysis assessment system 400 and/or quality engine 401 is configured to automatically capture or accept information from integrated software development and management systems to develop a readiness evaluation. In one example, the system generates a quality score that is configured to employ a plurality of data science models. The various models can be based on several factors, including: number of issues collected by a testing community/user group; distribution of collected issues across the issue lifecycle, which can include for example, submitted issues, approved issues, exported issues housed on a customer's bug tracking system; rating of issues collected by their severity and value, for example, assessed by a software project team as well as system based predictions based on issue attributes; validity of fixing the collected issues (e.g., were they marked as 'Won't Fix,' resolved, eliminated, etc.); scope of testing, such as duration and coverage; history of testing; history of testing, resolution, and subsequent tracking; among other options.

According to various embodiments, the quality assessment generated by the system does not judge all bugs the same. For example, a more severe or valuable bug (e.g., a bug that causes an app to crash or significantly impacts the user's experience) will lower the readiness/quality score more than a less severe or less valuable bug that has minimal significance to the app's functionality or user experience. In further embodiments, the system can be configured to generate calculations of quality in near real-time and ensure an up-to-date score is presented to the user via user interface displays.

In some embodiments, the system 400 and/or engine 401 can include a user interface component 404 configured to generate displays for assessment information, as well as to build dashboard views of available testing/development information and context. According to one embodiment, the user interface component is configured to display an assessment score on a scale of 1 to 100 that reflects the readiness of a code release. The user interface component 404 is configured to convey contextual information with the assessment score. In one example, the user interface component integrates a confidence evaluation of the assessment score based on a color associated with the displayed assessment. In further embodiments, information used to develop the assessment score can be displayed in conjunction with assessment value. The user may hover over various information displays that contributed to the score, and be given a visual indication of the impact each information grouping contributed to the score and/or confidence interval. In one example, the system displays an assessment score with a completion indication (e.g., curves 1210, 1212, 1214 of FIG. 12), and responsive to hovering over contributing information shown in the display, the display can reflect the portion of the score the hovered information contributed to the score. For example, an overlay display can be shown next to the assessment score indicating what portion of the score was contributed (e.g., 45 out of the 96 shown at 408, and an associated complete curve for the contribution). In various embodiments, the system can evaluate information groups (e.g., categories that contribute to the assessment score), and identify categories with greater potential to improve. The system can highlight these information groups for the users to visually indicate the greatest opportunity to impact the assessment score and/or a confidence value associated with the assessment score.

In various embodiments, the quality assessment system 400 can be part of a larger testing/development platform, where each has access to the data and information produced by either. In other embodiments, the assessment system 400 and/or engine 401 can include an integration component 406 configured to interact with external software development, software testing, version control and/or bug tracking systems (e.g., 408). In some embodiments, the system 400 can include a plurality of application programming interfaces configured to communicate with external software development systems (e.g., JIRA, GITHUB, etc. (e.g., 408)), and capture or access software development and/or testing information. In further embodiments, the system can capture or access all development/testing information available from external systems to incorporate into an assessment of readiness of a current software build, release, or product. In other embodiments, the system can filter available development/testing information to match a current build or release (e.g., same product, same functionality, similar product, similar functionality, etc.). Still others can weight the available information on similarity, giving matching testing/development information a greater weight than other testing/development information. In one example, the system can employ natural language understanding engines to determine a test/development context for captured information and use the determined context to determine similarity to a current test/development context, among other options.

The user interface component can be configured to associate color displays with the assessment score to convey contextual information: green: between 90 and 100 (e.g., likely ready for release); yellow: between 66 and 89 (possibly ready for release); and red: 65 and lower (e.g., likely not ready for release).

Figure 12:
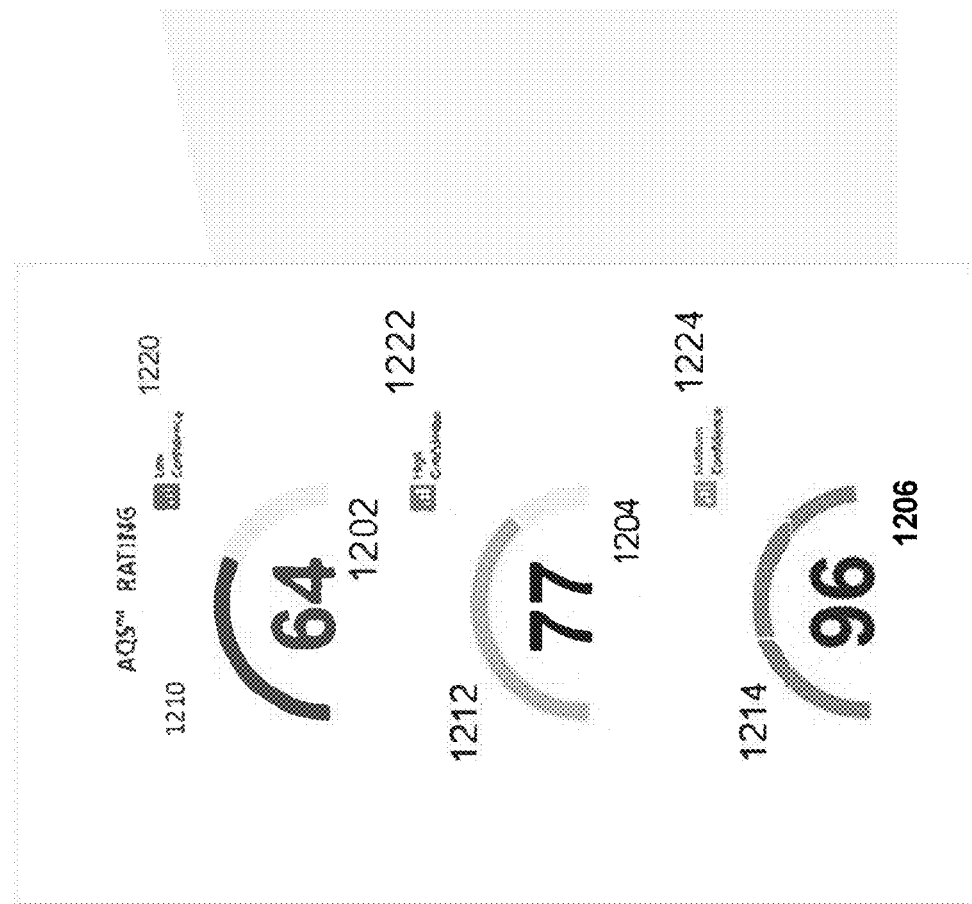
FIG. 12 is a screen capture of a visual element for displaying quality scores and/or confidence scores.

In the example shown in FIG. 12, there is an Applause Quality Score for three different builds (e.g., at 1202, 1204, and 1206). The first score in red is low and is made with low confidence (e.g., 1220). The second score in yellow (77) is in the middle range and is made with high confidence (e.g., 1222). The third score in green is high and is made with medium confidence (e.g., 1224). As shown in FIG. 12, the quality score rating can be paired with a confidence level determined by the system to rate a confidence evaluation of the system generated quality score. For example, the confidence level for an individual score can be based on the scale and scope of the testing conducted for the build such as duration and coverage, as well as the breadth of historical data collected on previous builds of the product or app, among other options. In various examples, as a user conducts more thorough testing over a period of time, the confidence level will rise.

In various embodiments, the AQS rating is a piece of the analysis that can be delivered by a testing platform that enables users to consider the underlying data that the score is built on, as well as factors that were not considered in developing your build's score. In further embodiments, the system and/or user interface component 404 is configured to generate displays to evaluate the build's AQS rating against the above objective ranges (low, medium, high); to understand the underlying nature of reported issues, their severity and value, type and status, as well as the product components they were reported on (e.g., over time that system can identify irregularities that direct users to better identify root causes); to evaluate the build's score against those of preceding builds, among other options. For example, a specific build might not generate a "high" score from the beginning, thus a goal for the specific build may be to have a steady, positive trend in the assessment score. In another example, if a first build scored a 60—which is in the 'low' category—and the second build scored a 75, the system identified strong progress and the context in which the improvement in assessment takes place. Further, the system can indicate that there remains room for improvement, and even allow the user to identify areas for improvement that can contribute the greatest impact.

In other embodiments, the system is configured to facilitate all phases of a software development lifecycle ("SDLC"). Naturally, the quality you expect for the initial build of a release will differ from what you may expect from the release candidate and the system is configured to track quality across phases of the SDLC and provide displays of quality over time for a product, build, and/or release candidate. In further embodiments, the system can be configured to incorporate the results from a full regression, and/or spot-check testing (e.g., for a hot fix), and weight the impact each evaluation has on the overall quality score. In further embodiments, the system is configured to accept user input on how to value information used in calculating software quality. For example, as a user reviews a build, and build-over-build trends (e.g., quality score timeline), the user can adjust how important various factors are that are used in the calculation.

In many conventional settings, the users and/or development teams have been traditionally viewed as providing the best assessment as to when their software may be ready, however, human factors often provide inconsistent results. For example, bias can affect the "ready" assessment and lead to omissions, oversights, and errors in testing. Various embodiments implement a quality score that can address many of these issues. Further embodiments can also leverage the benefit of user and developer knowledge by enabling users to submit, modify, or adjust weight values used in scoring quality based on what is important to them. In such implementations, the system enables the user to convey information that would otherwise be invisible to the system. In some examples, users can import information about testing via external systems, incorporate testing information from unconnected systems, incorporate information on personnel changes, and include other considerations.

In still other embodiments, the system can implement machine learning models that can be used to adjust various weightings in the quality score analysis. For example, the system can capture information on user-based changes to weighting factors, and train machine learning models on those changes and any characteristics that are associated with them. Pattern matching by the trained models enables the system to make similar adjustments in similar circumstances. The system can also recognize when changes made by the users result in reduced accuracy and/or confidence. In some embodiments, responsive to changes by the users, the system can automatically adjust a confidence determination. In one example, the system reduces a confidence score responsive to user customized values in the determination. Over time the system is configured to adjust the confidence score upwards to eliminate the customization penalty to confidence values.

In various embodiments, users can evaluate their builds or software release candidates based on a quality rating and contextual information on a confidence level associated with the quality rating. In some settings, the system can include functionality to trigger the release of a build from development environments (e.g., 410), to live or production environments (e.g., 412) based on selections in the user interface. In some embodiments, the system can present evaluations of user based criteria for release in the user interface (e.g., threshold quality score, threshold confidence score, threshold testing requirements (e.g., test coverage percentage, test cycle execution, threshold percentage of unresolved bugs, etc.)). The user interface can be configured to disable the release functionality in response to missed criteria. For example, a release build now button can be displayed as grayed out in the user interface, based on missed release criteria. In further embodiments, a user can select override functions in the user interface to re-activate the grayed out option. A warning message can be displayed in conjunction with such override functionality-"You missed (example criteria). Are you sure you want to enable release?" Other embodiments can employ different warning messages. In still other embodiments, various user levels and permissions can be assigned, and include levels of override capability. For example, a user can assign a "no override" status to specific criteria—in which case, the system is configured to report back to the user the condition and an inability to override at the current permission level. In further example, a privileged user may be required to delete the non-override status before permitting release of the associated build. Alternatively, if further testing is done to meet the criteria, the system can permit release without override.

In some embodiments, the system can highlight testing information relevant to a missed criteria. The user may then navigate to information sources that would allow the missed criteria to be improved. For example, test execution percentages may be the missed criteria, and the system is configured to highlight the published test information and the executed test information. In further embodiments, the system can automatically generate a recommendation and display based on the missed criteria—"Execute more published tests to bring the quality score up."

Figure 5:
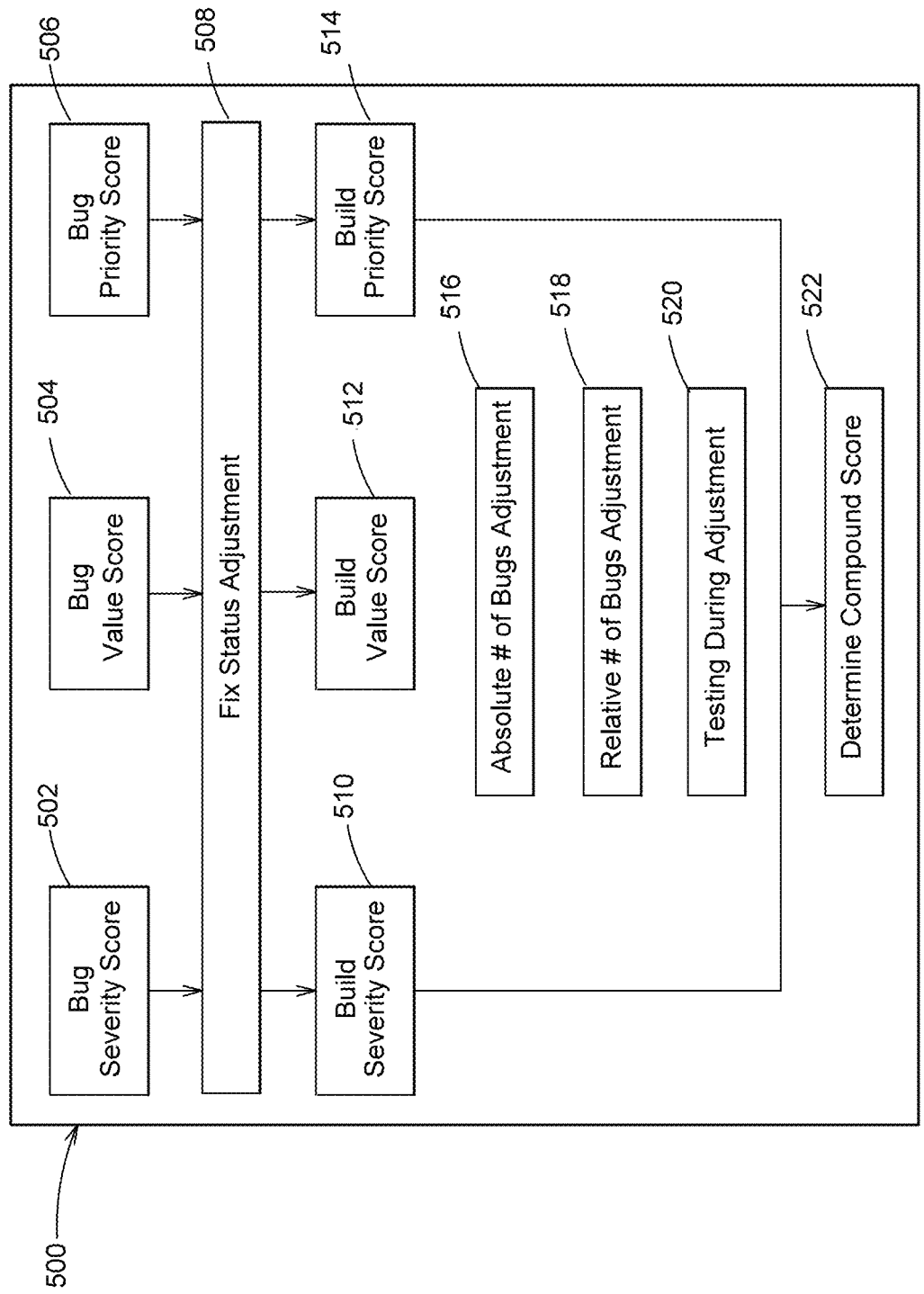
FIG. 5 is an example process flow to determine a software quality score, according to one embodiment.

FIG. 5 is an example process flow 500 used in determining a software quality score. In various embodiments, different information values can be used to generate a quality score. For example, an exploratory score can be built from subjective information as well as objective information. In one embodiment, the process includes a plurality of information sources that contribute to the calculation. In one embodiment, the information source can include a bug severity score 502, a bug value score 504, and a bug priority score 506. According to some embodiments, a bug severity score (e.g., 502) can be set by a tester once a bug report is submitted. In some examples, the tester submission is confirmed during a review. In other examples, a bug severity can be changed in a test audit and the changed value used in the determination of an overall quality score. In further embodiments, a bug value is set by an administrative user or another user during test triage or review. Similarly, bug priority scores can be established by the system user (e.g., a customer). In some examples, a bug submission system is used to capture information on a software bug including, bug severity and/or bug value. The bug submission system can be configured to assign a bug priority score based on submitted information. In some alternatives and/or additional embodiments, the system can assign a bug priority score based on information contained in a bug submission. In one example the system can be configured to match bug information to customer defined criteria and assign a bug priority score accordingly.

At 508 the initial scores for severity value and priority can be adjusted based on status information associated with a given bug. In some embodiments, bug scoring is configured to reflect a software quality penalty in that bugs with a higher priority and/or greater severity reflect more value to the customer and their software thus have a larger impact on determining a software build that has lower quality. In some examples, the values assigned for severity and bug value score can be based on the number of categorizations. In one example, bug severity scores are based on low, medium, high, and critical severity levels and each category can be assigned an increasing severity value (e.g., low—one, medium—two, high—five, critical—13). Various embodiments use a Fibonacci progression for assigning numerical values to the respective categories, however other increasing values can be used. In another example, bug value score categories can include no value, somewhat, very, and exceptional. The categories can be assigned numerical values (e.g., know value—one, somewhat—two, very—five, exceptional—13). Similar to severity, the numerical value can be based on a Fibonacci progression, however other increasing values or progressions can be used.

Based on capturing all bug values (e.g., severity, value, priority) the system establishes a score for each bug based on the assigned values and adjusts the assigned values based on the bug status (e.g., 508). According to one embodiment, numerical values are reduced based on a bug being fixed and/or having the fixed verified. In one example, numerical values assigned to each category can be significantly reduced based on a fixed being made to the bug and further reduced based on a fixed being made to the bug and the fix being verified. Table A illustrates example adjustments that can be made to bug severity scores. In other embodiments, similar adjustments may be made to bug value scores.

TABLE A

| Bug Severity Scores | | | | |
|---|---|---|---|---|
| Bug Fix Status | Low | Medium | High | Critical |
| Not Fixed | 1 | 2 | 5 | 13 |
| Fix Not Verified | 1 | 1 | 2 | 5 |
| Fix and Verified | 1 | 1 | 1 | 2 |

Table B illustrates example adjustments that can be made to bug priority scores.

TABLE B

| Bug Priority Scores (6 Priority Levels) | | | | | | |
|---|---|---|---|---|---|---|
| Bug Fix Status | P6 | P5 | P4 | P3 | P2 | P1 |
| Not Fixed | 1 | 2 | 3 | 5 | 13 | 21 |
| Fix Not Verified | 1 | 1 | 1 | 2 | 5 | 8 |
| Fix and Verified | 1 | 1 | 1 | 1 | 1 | 3 |

Other example adjustments may be made to severity and/or priority scores. In further embodiments, additional priority levels may be used, and thus the numerical values and adjustments made to them can change based on what testing targets are important to a given user, how many priority levels are defined, etc., Process 500 continues with the aggregation of the adjusted bug severity scores into a build severity score at 510, the aggregation of the adjusted bug value scores into a build value score 512, and the aggregation of the adjusted bug priority scores into a build priority score at 514. According to some embodiments, once values are aggregated process 500 may include steps to calculate a simple average of severity, value, and priority. In addition, the average values can be normalized to yield the final build severity, build value, build priority score-which may be executed as part of 510 through 514.

Figure 14:
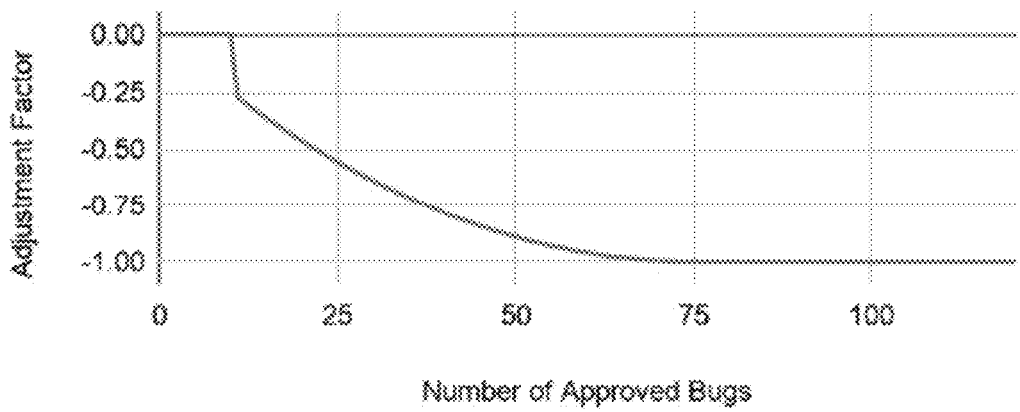
FIG. 14 illustrates a calculation for an adjustment factor based on a number of approved bugs for a build or project.

Process 500 can continue at 516 with adjusting the value scores by an expected or reasonable number of bugs that would normally be generated per build for a software product. In various embodiments, process 500 may reference a database of prior builds and/or software projects and leverage numbers of bugs of prior testing to establish a reasonable number of bugs that the system can use as part of the adjustment process. According to some embodiments, using an adjustment on an absolute number of bugs enables more accurate comparison of testing results across builds of products, across the different phases in the product lifecycle, across different product types, and across products serving different industries. In other embodiments, the system can allow end-users to define a number of approved bugs that will be used to calculate the adjustment factor. In one example, FIG. 14 illustrates a calculation for an adjustment factor based on a number of approved bugs for a build or project.

In other embodiments, users may tailor the adjustment factor being employed to customize their quality score.

Figure 15:
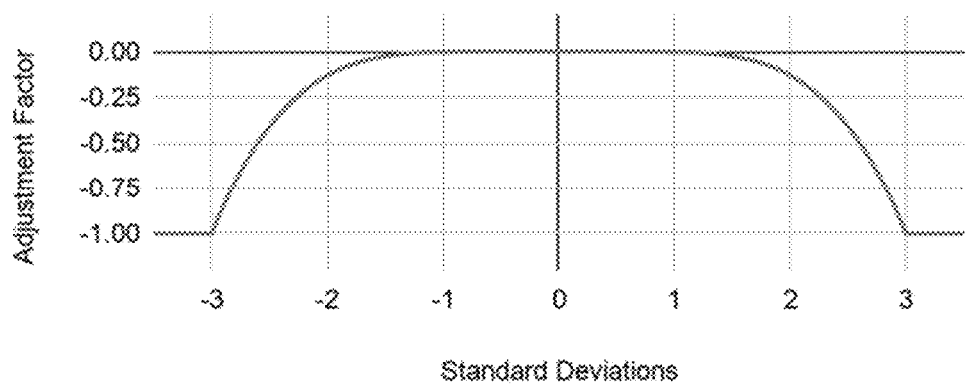
FIG. 15 illustrates an example adjustment factor based on standard deviations from a one year product average for bugs.

In further embodiments, process 500 continues with an adjustment to the scores based on a relative number of bugs (e.g., 518). The relative number of bugs adjustment can be based on an expected number of bugs per build/project. In the relative number of bugs step, the process uses results previously collected on a given build/project to estimate an expected number of bugs that will be generated. In one example, the magnitude of adjustment is determined as a function of quality for the number of bugs for the build is from a one year running product average. The determination of how far can be based on standard deviations. In one example, FIG. 15 illustrates an example adjustment factor based on standard deviations from a one year product average for bugs.

Figure 16:
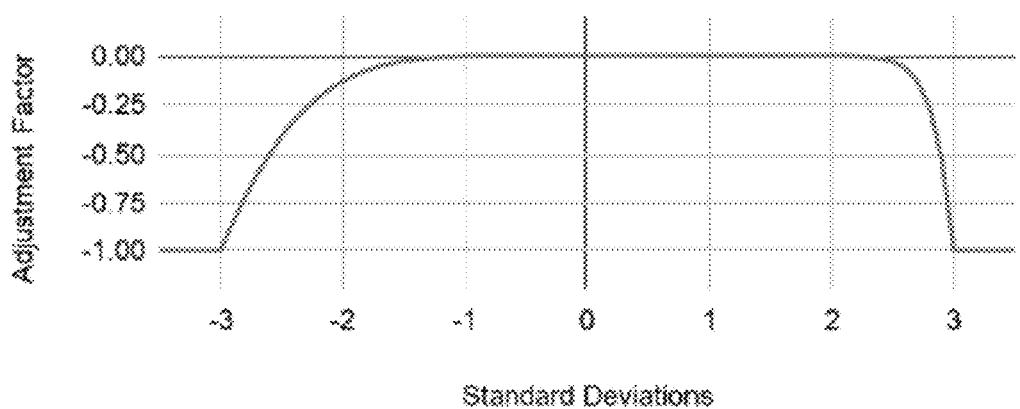
FIG. 16 is an example adjustment factor based on standard deviations from a one-year product average for testing duration.

According to one embodiment, process 500 continues with an adjustment based on testing duration (e.g., 520). In various embodiments, the adjustment can be based on observed testing durations for previously executed test cycles on a product, build, or release. In one example, the magnitude of adjustment is a function of how far the testing duration for the build is from a one year running product average in terms of standard deviations. Other adjustments can be used including different time periods for running product average as well as various distribution curves instead of standard deviation, among other options. Shown in FIG. 16 is an example adjustment factor based on standard deviations from a one-year product average for testing duration.

Once the various adjustments have been completed (e.g., 516 through 520), process 500 defines a compound testing score used in determining a software quality score. In some embodiments, the calculation of the compound testing score can be based on user facing configurations. In one example, users can specify that bug value be used or not used, severity used or not used, priority used or not used in determining the compound testing score. According to one embodiment, each scoring component (e.g., build severity, build value, and build priority score) can be added together once multiplied by a weighting factor. In one example, Table C shows example values that can be used as the weighting factor, and the various weighting factors can be selected based on user facing configurations as given by:

$$S_1 \times (\text{Build Severity Score}) + V_1 \times (\text{Build Value Score}) + P_1 \times (\text{Build Priority Score}).$$

TABLE C

| | Exploratory Testing Coefficients | | | |
| --- | --- | --- | --- | --- |
| | Severity Used | | Severity Not Used | |
| | Value Used | Value Not Used | Value Used | Value Not Used |
| Priority Used | $S_1 = 0.2$ $V_1 = 0.2$ $P_1 = 0.6$ | $S_1 = 0.2$ $V_1 = 0$ $P_1 = 0.8$ | $S_1 = 0$ $V_1 = 0.2$ $P_1 = 0.8$ | $S_1 = 0.2$ $V_1 = 0$ $P_1 = 0.8$ |
| Priority Not Used | $S_1 = 0.8$ $V_1 = 0.2$ $P_1 = 0$ | $S_1 = 1$ $V_1 = 0$ $P_1 = 0$ | $S_1 = 0$ $V_1 = 1$ $P_1 = 0$ | — |

According to some embodiments, process 500 may include optional steps that are used to validate the calculation of a compound score. For example, process 500 may include validation conditions to return a valid compound score. In one embodiment, process 500 may require a minimum testing process that can be executed in order to return the compound score. In one example, process 500 may evaluate a number of test cycles used on a given builder product. If no test cycles were run, process 500 assigns a null value to the compound testing score. If only one test cycle was executed, process 500 may test whether the test cycle was accepted by at least one tester. If not accepted, process 500 returns a null value. Otherwise, the calculated value will be output. Additional validation conditions can be tested. In one example, process 500 will test if a minimum number of bugs has been returned during testing. If the minimum is not met, process 500 returns a null value.

Figure 6:
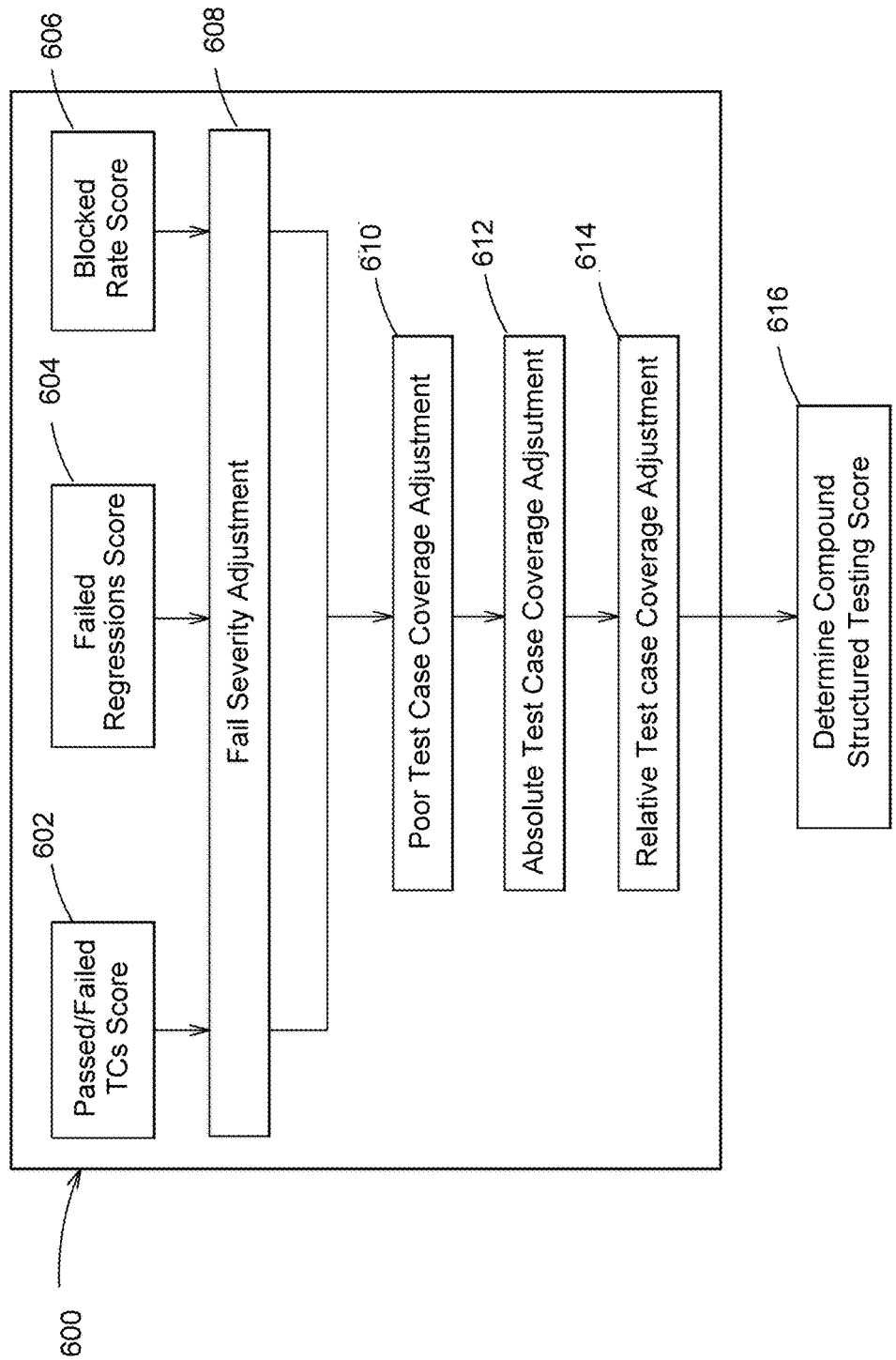
FIG. 6 is an example process flow to determine a software quality score, according to one embodiment.

FIG. 6 is an example process flow 600 for generating a compound structured testing score. In various embodiments, the testing scores generated in FIG. 5 and FIG. 6 can be combined to yield a software quality score. Process 600 can be used to analyze a plurality of information sources. For example, scores may be generated based on passed/failed test cases (e.g., 602), failed regressions (e.g., 604), and blocked rate (e.g., 606).

According to one embodiment, regression test cases are used to track test cases that passed on at least one previous build and validate that new changes/new code have not impacted existing functionality. Blocked rate refers to the test cases that could not be executed because of external dependencies—for example, the test environment was not ready for the test case.

Process 600 can continue at 608 with adjusting the various scores based on a fail severity. In one example, failed regression test cases are weighted greater than failed non-regression test cases. In some examples, the penalty can be proportional to the number of test cases that were executed. In other examples, the penalty can be used to reflect that regression test cases could impact software quality at a greater rate than non-regression test cases. In one embodiment, process 300 uses a three times multiplier for weighting field regression test cases over nonaggression test cases.

Figure 17:
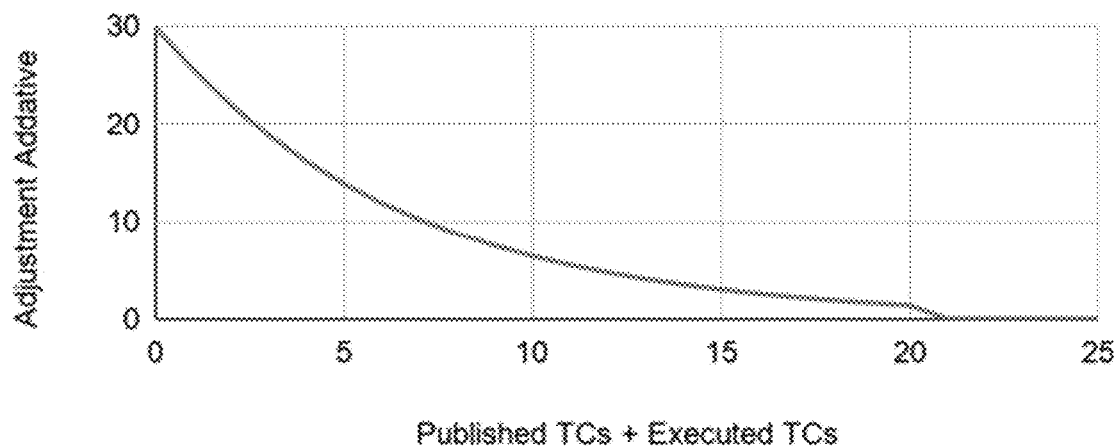
FIG. 17 illustrates an example adjustment that can be made based on poor test case coverage.

Process 600 can continue at 610 with adjustments to the compound structured testing score calculation. For example, a poor test case coverage adjustment may be made at 610, based on a number of published test cases and a number of executed test cases. For example, step 610 can multiply a number of published test cases with the number of executed test cases, and if the result is less than or equal to the threshold (e.g., 20), a poor coverage adjustment can be made. FIG. 17 illustrates an example adjustment that can be made based on poor test case coverage.

Figure 18:
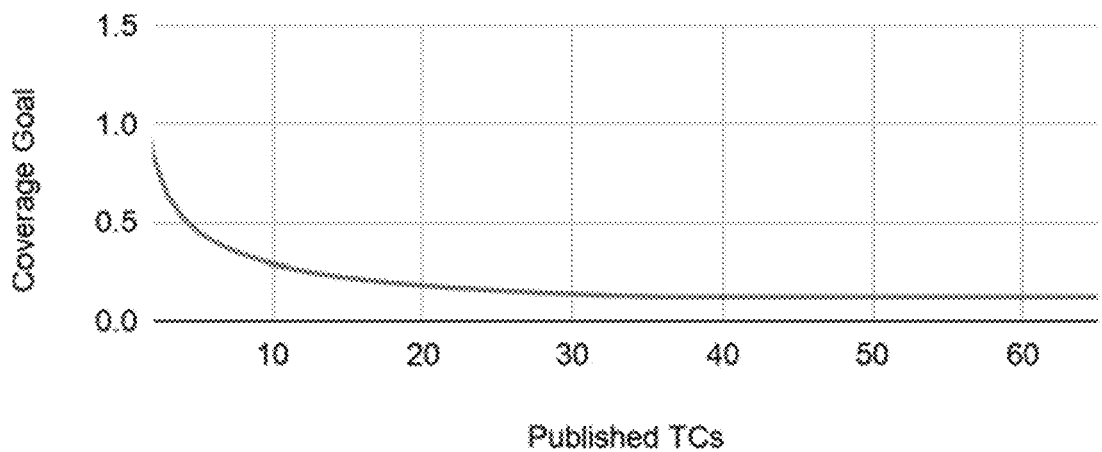
FIG. 18 illustrates an example adjustment that can be used based on a testing coverage goal when compared to a published set of test cases.

Additional adjustments can be made that provide an absolute test case coverage adjustment factor. For example, process 600 can continue at 612 with an adjustment based on absolute test case coverage. FIG. 18 illustrates an example adjustment that can be used based on a testing coverage goal when compared to a published set of test cases.

Other adjustments can be used, and adjustments may be based on a comparison of actual coverage versus coverage goal. In one example if actual coverage is greater than a coverage goal, the adjustment can be based on subtracting the coverage goal from actual coverage divided by the actual coverage in terms of the number of test cases. In another example if average coverage is less than or equal to a coverage goal the adjustment value can be based on subtracting the coverage goal from the actual coverage divided by the coverage goal.

Figure 7:
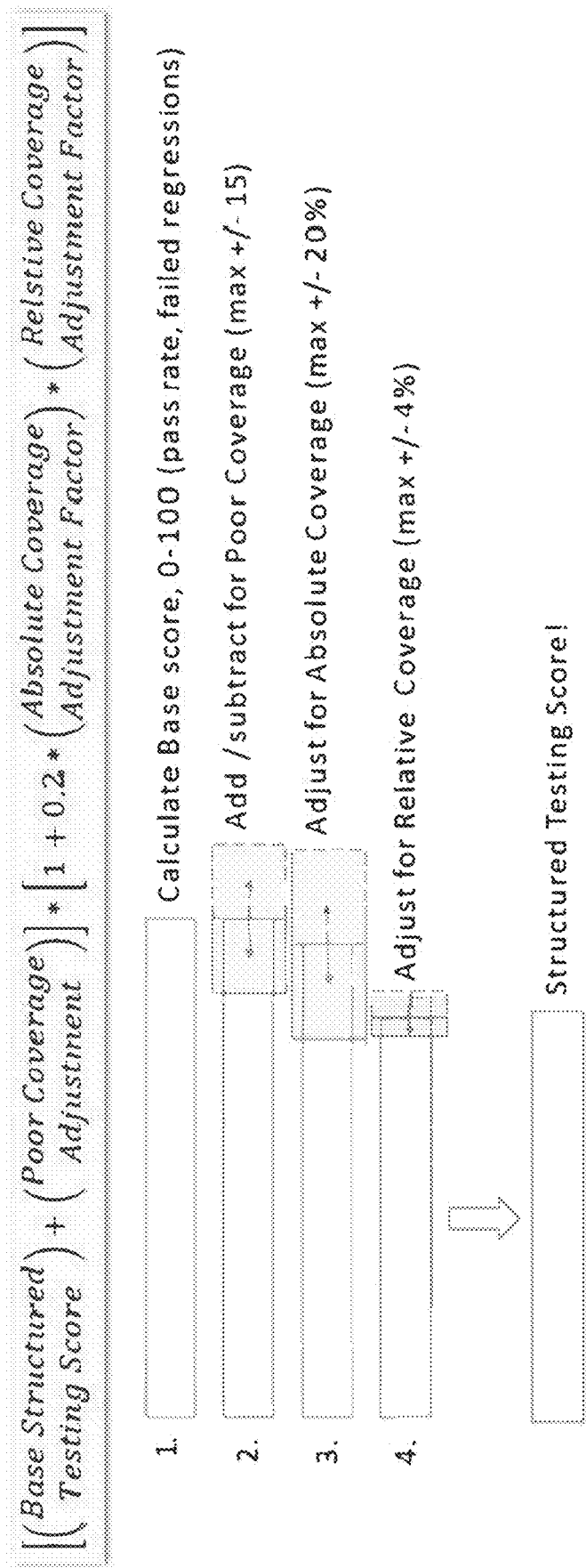
FIG. 7 is an example process flow to determine a software quality score, according to one embodiment.

Additional adjustments can include a relative test case coverage adjustment (e.g., at 614). In some embodiments, the relative coverage adjustment factor can be based on an average coverage per build reduced by actual coverage and divided by a standard deviation analysis of the two values. Once the adjustments are made (e.g., 610-614), process 600 can conclude with the determination of the compound structured testing score at 616. FIG. 7 illustrates an example algorithm that can be used to determine a compound structure testing score. FIG. 7 describes example adjustments can be made in calculating the final score. FIGS. 8-9 illustrate example executions that generate structured testing scores and applications of adjustments to determine the final adjusted scores.

Once the compound scores are generated (e.g., FIG. 5, FIG. 6), the software quality score can be determined from underlying compound scores. In one example, software quality score can be computed based on a weighted average of the underlying compound scores. According to some embodiments, users can assign weight values to underlying sub-scores, and the system is configured to calculate a software quality score based on the weighted average and the assigned weights. In one example, the system can present a user interface that allows the user to enter specific weight values. In another example, the system can present a sliding scale that allows the user to move a visual indicator along the position displayed between test sub-scores. For example, an exploratory testing sub-score may be shown on one side of the sliding bar and a structured testing sub-score may be shown on the opposite side. The user interface is configured to allow a user to manipulate a visual indicator between the two scores, and thus assigning a weight value to each reflective of the position of the visual indicator.

In some embodiments, the system can calculate a software quality score based on a simple average of the underlying sub-scores. In further embodiments, the system can be configured to display different calculations of a software quality score and indicate the basis on which the software quality score was calculated (e.g., simple average, weighted-average, user-defined weighting, etc.). In some embodiments, the system can be configured to determine a weighted average that is based on historical testing profile of the software product or build. For example, by examining how the product was tested in the past, the system can determine what the customer might deem as more "meaningful" or "important" and set the weights for the quality score accordingly. In further embodiments, the system can execute AI algorithms to identify the weights for a quality score, through a feedback loop. For example, the system can analyze the software product's history along with history collected on other products as well as additional indicators that can be used to dynamically calculate the weights. In still other embodiments, hybrid approaches that employ weighted averages and AI algorithms can be implemented to develop weightings used. In one example, both calculations are used and an average value from the two approaches can be used. In another example, the system can use a primary approach (e.g., weighted average or AI) and use the secondary approach to adjust weights determined by the primary approach, among other options.

According to some embodiments, in conjunction with a software quality score the system generates and displays a confidence evaluation of the software quality score. According to some embodiments, the system is configured to evaluate a number of dimensions to determine a confidence level in the calculated quality score. For example, the system can evaluate the maturity of the products testing implementation (e.g., enough data was collected on previous builds, enough data was collected during previous test cycles, product is properly set with active components, prior releases and/or builds made lives and met company goals, etc.). In another example, the system can evaluate if a software build was sufficiently tested (e.g., expected total testing duration, expected number of testers, expected number of Geos (e.g., tester countries), expected number of device environments, etc.). Other example dimensions that the system can evaluate in determining a confidence level to include the reliability of the executed exploratory testing. (e.g., threshold number of bugs completed triage, bug priority is aligned with a bug tracking system and definitions, issue backlog is properly managed, etc.), and the reliability of the executed exploratory testing (e.g., enough test cases have been published (e.g., threshold number of published test cases has been met), expected number of runs per test case has been met, expected coverage threshold has been met (e.g. executed test cases out of published test cases), etc.).

Figure 10:
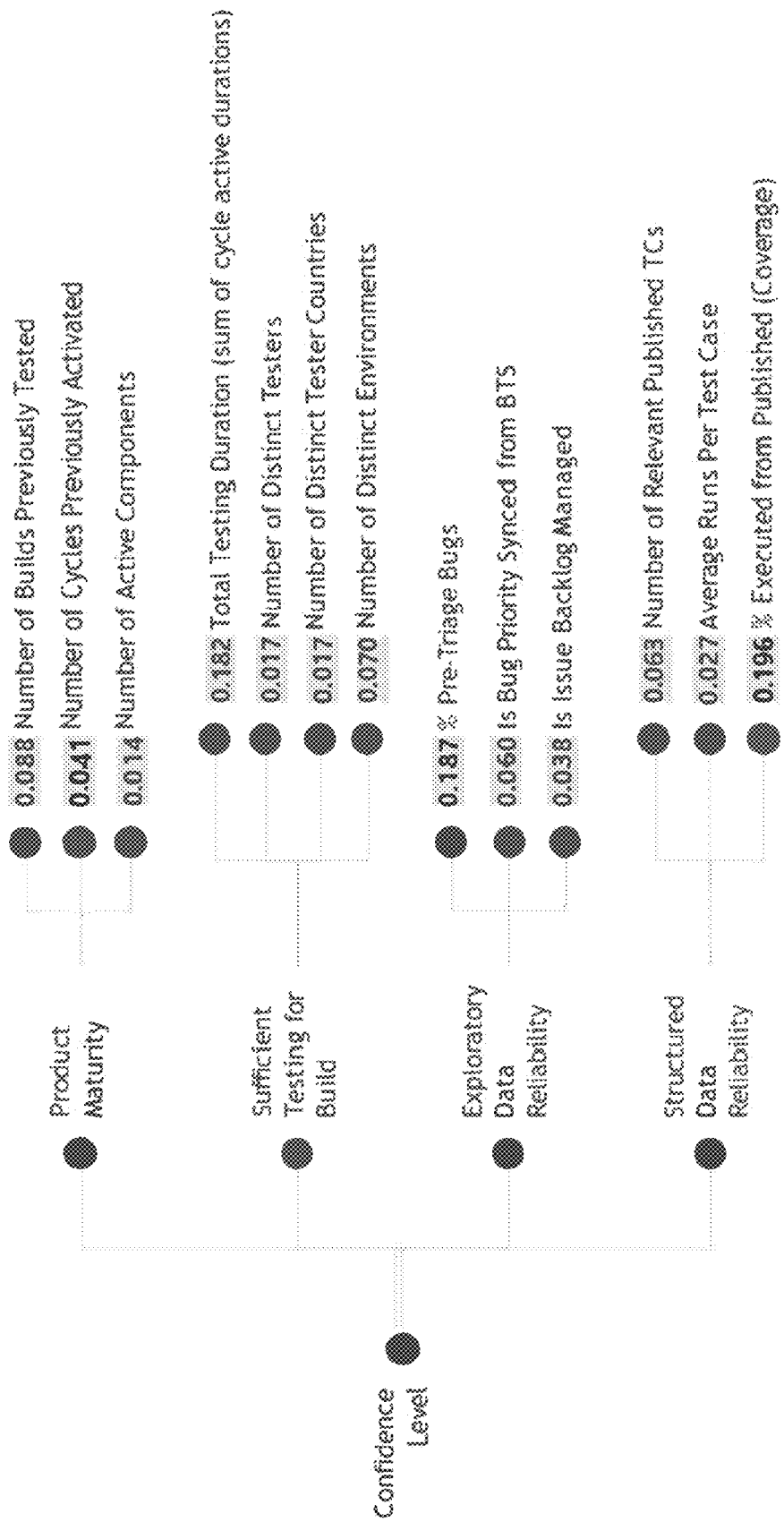
FIG. 10 illustrates example dimensions to analyze for determining a confidence level, according to one embodiment.
Figure 11:
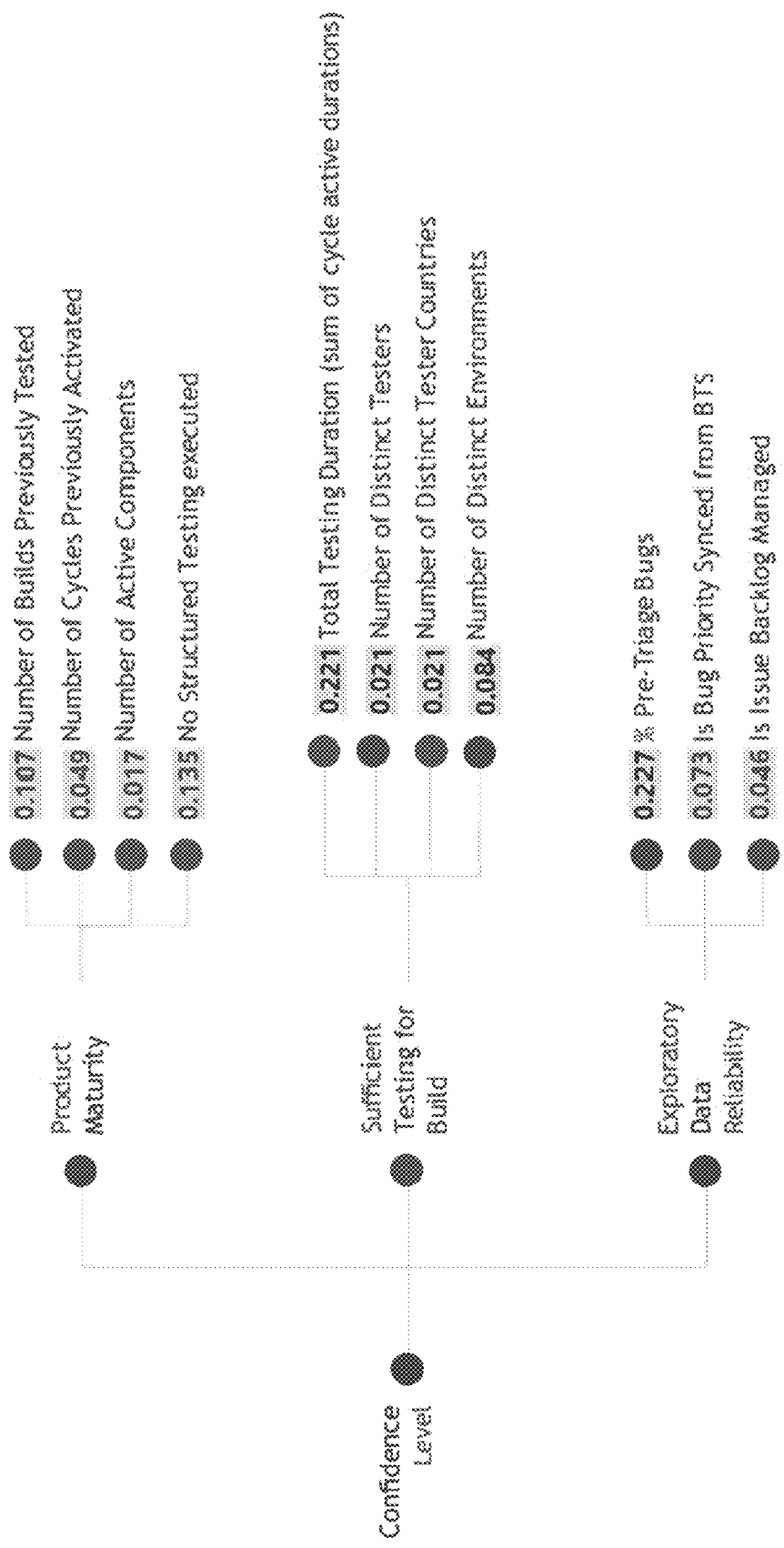
FIG. 11 illustrates example dimensions to analyze for determining a confidence level, according to one embodiment.

FIG. 10 illustrates an example evaluation of a confidence level based on a plurality of confidence coefficients. The confidence coefficients can be organized based on a number of categories. For example, the categories can include product maturity, sufficient testing for build, exploratory data reliability, and structured data reliability. In some embodiments, the confidence coefficients that will be evaluated are dependent on whether or not structured testing is part of an evaluation. FIG. 10 illustrates an example with structured testing. FIG. 11 illustrates an example where no structured testing is used as part of the evaluation. Returning to FIG. 10, the dimensions that are factored into the confidence determination include: the number of builds previously tested; number of cycles previously activated; the number of active components in the test execution; total testing duration (e.g. some of cycle active durations); number of distinct testers; number of distinct tester countries; number of distinct environments; percent per-triage bugs; evaluation of bug priority-synced from bug tracking system or not; is issue backlog managed; number of relevant published test cases; average runs per test case; percent executed from published (e.g. coverage evaluation); etc.

According to some embodiments, the confidential coefficients are given individual weights that add up to 100. The confident score can then be calculated as a sum of products between dimension values and coefficients. The score is then translated into one of four confidence levels: very low (0 to 35%), low (35 to 65%), medium (65 to 85%), and high (85 to 100%). In various embodiments, the system is configured to limit user exposure to the determined confidence level. In other embodiments, the user can see the confident score on a display of the confidence levels. In still other embodiments the system may be configured to display the percent score assigned to the confidence level.

FIG. 12 is a screen capture of a user interface element showing quality scores for three build examples. Various embodiments can incorporate additional functionality into the displayed quality score as well as the display confidence level. For example, a learn more visual element (not shown) can be displayed with a quality score. According to some embodiments, the system can analyze contributing factors from the calculated quality score to identify score having the greatest impact on a low, medium score, and/or high score. In one example, low scores can be analyzed by the system to identify contributing calculations with the greatest deviation from its potential contribution to the overall score. The system can then generate a display associated with the contributing facet or analyzed dimension and at least summary information, for example, of the underlying test data. To provide additional examples, where test coverage score contributed greatly to a low score (e.g., relative to other scoring factors), hovering over learn more can provide a recommendation to execute more published test cases to increase the quality score. The recommendation can be displayed as part of an overlay that provides summary information on the published test cases and information on the actual executions. In further embodiments, the system can project new quality scores based on assuming further test case execution, and show potential quality scores that would result from increasing execution by various percentages (e.g., 10%, 20%, 30%, . . . 80%, 90%, etc.). In some examples, the system can be configured to determine if increased values can move the quality score into another level (e.g., low to medium, medium to high, etc.) and provide those calculations as recommendations.

In further embodiments, the system can determine that adjustments to individual factors alone will not move the score into a new category, and the system can project options for how many factors/dimensions need to be improved to reach a quality score level.

Figure 13:
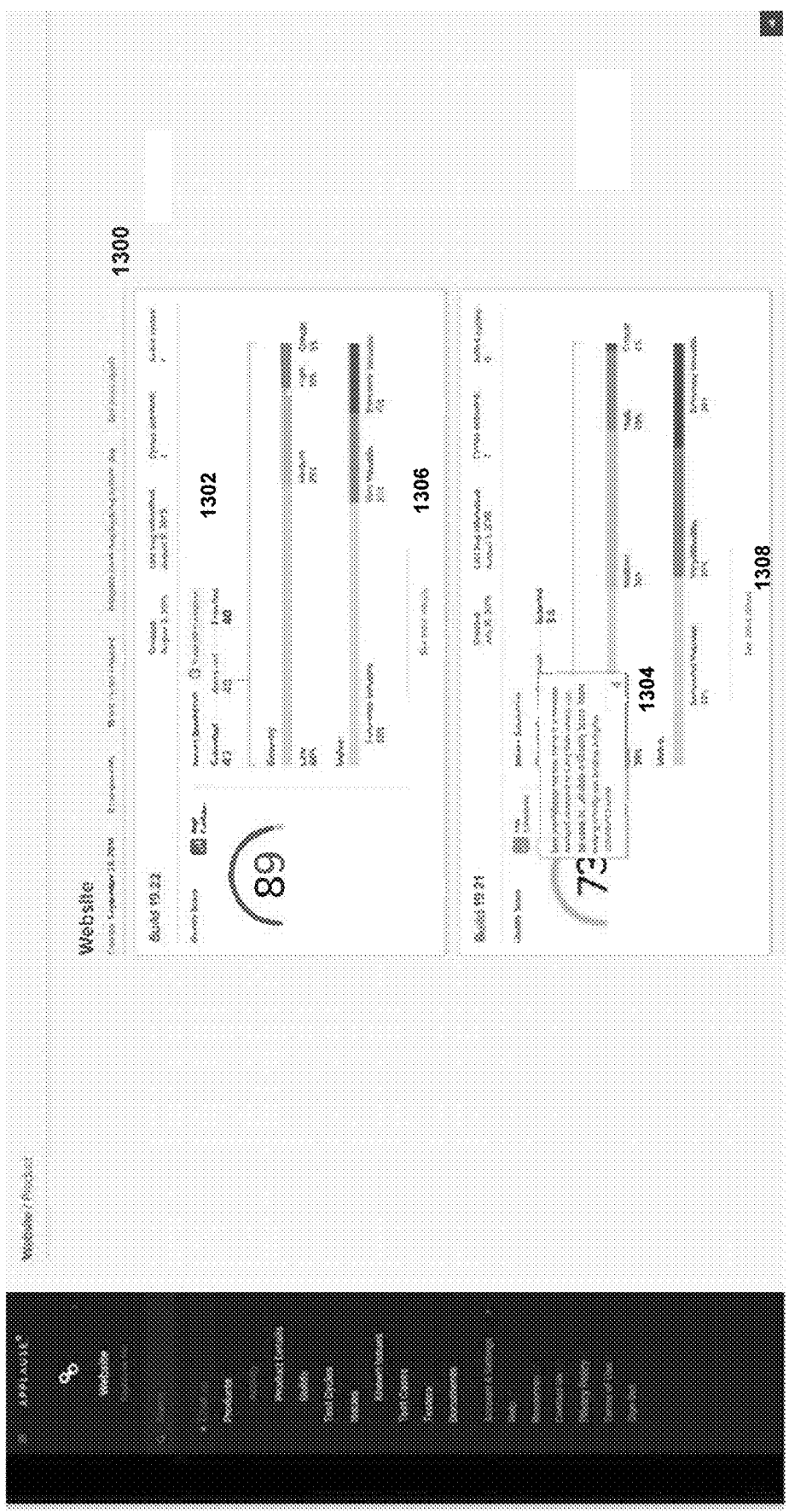
FIG. 13 is a screen capture of an example quality score dashboard, according to one embodiment.

FIG. 13 is an example screen capture of a quality score dashboard view 1300. According to one embodiment, quality scores can be shown with confidence levels. In further embodiments, the quality score may be accompanied by additional information to provide additional context for the ultimate score. For example, at 1302 an issues breakdown interface is provided. In this display, bug tracking information is presented to the user to provide context. According to one example, the user can access information on specific bugs and/or aggregate information on issues identified by a bug tracking system. For example, the distribution of bug severity for the identified issues can be displayed as well as any bug value associated with the identified issues. Shown in the interface at 1304 is an option to access more details. Responsive to selection of 1304 the system can provide additional information and/or recommendations on improving a quality score and/or a confidence level associated with the quality score. In some examples, the system can highlight factors or dimensions that had the greatest relative contribution to the score, and present those responsive to selection of see more details in the user interface.

According to some embodiments, hovering over a score or level in the user interface will trigger an overlay display. For example, at 1304 shown is an educational or informational display regarding the confidence level associated with the quality score of 73. In further example, the overlay display may also include an option to select "see more details" (not shown). In various embodiments, the display may also include an option for see more details at 1308. When selected, the system is configured to transition the user interface to recommendations on contributing factors used in determining score, and how to improve those factors and/or the overall score.

According to one embodiment, selection of see more details may cause the dashboard display to shift left in the user interface, to allow room in the user interface to introduce summary views associated with the contributing factors/analyzed dimensions on the right side of the user interface. In some embodiments, the summary views may include detailed information that makes up the information analyzed to generate a score. The summary views may be organized based on analyze factors, and include details on product maturity, sufficiency of testing, exploratory data reliability, and/or structured data reliability. In some embodiments, the summary views can be organized based on a relative contribution to the score and/or a relative degree of potential improvement to the score. In still other embodiments, the system can be configured to access some reviews and/or detailed views of underlying test information using the navigation options displayed on the left side of the screen. The system may also provide the option of accessing quality score and/or confidence level information within each of the displays accessed using the navigation options on the left side of the screen.

Further embodiments, leverage the data captured, for example, by the DataTap proxy in conjunction with codeless test automation functionality. According to various aspects, "codeless" describes implementation that enables unsophisticated users to execute a series of steps on a respective device where the system records the user's operations, selections, navigations, etc., and builds automated test functions and test suites that can be executed against multitudes of real devices. In some embodiments, codeless functionality is used to augment the data capture and generation of test cases. According to some embodiments, the captured data flow (e.g., from a DataTap function/service) can be used as an approximation of user inputs that cause test case execution that can be recorded or emulated and thereby used to generate new test cases, test suites, and/or test cycles.

According to some embodiments, the system is configured to provide access to mobile device emulation, that can be generated on request for a test recording session as part of codeless operation. The mobile device emulation is configured according to the parameters associated with one or more devices the user selects in the user interface to evaluate. In further examples, the captured data traffic substitutes for user input, and the system can proceed without user intervention or even display in a user interface. In some examples, the user specifies a software build or application code that they wish to test on the mobile device, and the automation system handles instantiation of the device emulator and loading of the build for test. In some examples, the system extracts specification of the test environment (e.g., software build or application code, test device platform, (e.g., iOS version, etc.)) that is the test target from captured data traffic. The system may or may not displays interfaces showing the selected mobile device and the software executing on the device.

In some examples, the emulation of a test device (e.g., a mobile device) can be executed on a backend system or associated processes where any and/or all activity being executed by the software can be recorded in real time, while streaming screen captures of that activity to the user. According to some embodiments, separating recording functionality from rending or streaming of the screen captures enables the automation system to function at normal application speed, and provide an emulation of the software under test that is not delayed due to the recording. Various conventional approaches fail to provide this operation, and further induce errors due to processing delays associated with the recording. In various examples, streaming screen captures back can occur to a user as an initial test session is recorded and executed enables the system to operate without the delays that plague many conventional approaches. Eliminating the user based on the captured data flow/communication can achieve the same effect.

In some embodiments, the system is configured to record all the execution information generated by the emulator including communication logs, execution information, display parameters, display elements, etc., as the codeless approach triggers functions on the emulation. Once the test is complete, the system processes the recorded data, object, selection, user identified breaks, etc. into a sequence of operations that form the test. In some embodiments, the underlying code that will be executed when running the test is not shown in the test display. As discussed above, the system can validate the generated sequence to determine that no additional interactions, record the data flows that results, and compare them to originally captured traffic to ensure the same flows occur. In some embodiments, the system can present a user interface that displays any inconsistencies to an end user. By providing, for example, side by side displays of a codeless generated test, with identification of any difference in the resulting data flows, the system can facilitate validation and correction of issues with functionality unavailable to many conventional approaches. In further embodiments, the system is configured to identify discrepancies in resulting test flows and automatically modify a generated test case to resolve the discrepancy. In some examples, the system can substitute a given function from a set of known functions with known parameters. According to one embodiment, by identifying additional data flow that results from a generated test, the system can match a new function with known properties that eliminates the additional dataflow and replace that function in a generated test. Various embodiments incorporate databases of test functions and data properties that are triggered on execution. The system can search the databases of functions and generate and validate fixes for interactions that exceed an original test case execution.

As discussed above, codeless functionality can be implemented to use the captured data traffic, flows, and execution flows to substitute/approximate a user and user interactions. For the following examples, the described user can be replaced by the captured data traffic, data flow, and/or execution information. In some embodiments, a user can specify any number of devices to test, as well specific parameters for the devices, including software builds. An emulation of the desired device can be displayed for a test recording session. In some embodiments, the system is configured to stream screen captures from the executing emulation to the user rather than provide a remote emulation or emulation instance to be run on the given device. While the user is interacting with the streamed screen captures, the system can be configured to record the activity (e.g., element select, responsive execution, communication stack, etc.) at the emulator. In various embodiments, the system is configured to emulate execution and stream screen captures to the user so that the user need not have any knowledge that they are not interacting directly with a live application under test. In further example, ensuring the users interact with the application under test as if it is live and direct improves the ability of the system to create automated tests that reflect the application as it will be used, including the timing of interactions that users trigger. Further the system can map user selection made on the displayed screen captures to actions at the application/emulator.

According to some embodiments, the recording of the selected operations, underlying operations, responses, and data flows, is then translated in testing code to executed as part of an automation test or test suite. According to one embodiment, the system is configured to translate recorded operations into automated test based on repeating user interface selections made by a user. In order to trigger the same selection made by a user the system can be configured to find a target reference for a place clicked on in an application during a recording session. There are multiple paths the system can use to locate that target element. For example, the system can employ accessibility locators (e.g., where present in an application), but the system is also configured to account for scenarios, environments, and/or application where accessibility locators are not present. In another example, the system is configured to traverse a decoded digital representation (e.g., XML) of a currently displayed screen to generate a relevant path to reference the targeted object/element. In further embodiments, the system is configured to resolve ambiguity using dynamic three dimensional references.

Stated broadly, the relevant path to reference a targeted element/object can be ambiguous because, for example, on any given screen some elements may overlap each other visually, and the generated digital representation does not reflect positional overlap. According to some embodiments, the translation process generates one or more mappings of an X/Y coordinate tap done on a static image to a dynamic 3-dimensional reference. The dynamic 3-dimensional reference is defined to be stable across various device screen sizes and operating system versions—in essence, establishing a Z index for positioning. As part of finding a target reference, the system can be configured to determine multiple reference methods (e.g., accessibility locators, decoded digital representation, 3D reference, etc.) for the same target coordinate. In some examples, the system is configured to record multiple reference points and select from the multiple options the best approach. Having multiple access approach improves flexibility of the system, and for example, can preserve fallback access methods should subsequent application builds remove a current access point. According to various embodiment, reference path can be assigned priority, where an accessibility locator is given the highest priority. If a future build removes that accessibility locator, and the system has stored another reference (e.g., XML path-based locator from original recording), the system can still execute the test using the stored XML path-path locator. In one example, the system can note the missing accessibility locator but still continue to execute the test by using the fallback locator.

Other examples translations include operations executed by the system to reflect timing of actions, swipes in mobile device user interface, and other device operations executable on mobile device platforms. In some embodiments, timing of action can be captured for automated test generation. Stated broadly, high fidelity with the speed of the users' interactions and the playback process is a goal when developing a test that recreates the original test approach. Some embodiments are further configured to resolve the issues associated with timing delays that are human based but not necessarily part of a testing scenario. For example, what if the person was just slow or indecisive and that added unnecessary wait times into the test. For example, there are times when the user/tester would want to click on an element as soon as it appears. In some embodiments, the backend processing system is configured to infer the desired result by inspecting the element and page and determining if the user was waiting for some dynamic changes on the page (by comparing frames) or just responding slowly during the test recording (e.g., no changes occur during wait period), and optimize the action wait times for most efficient test execution. According to various embodiments, efficient test execution can be important as the real devices tests are executed on are physical and can be limited in number. Thus, in various environments the more efficient the tests execute on real devices, the more efficient and cost effective the system is and the faster they produce results.

According to some embodiments, a back end is configured to process a recording of the execution activity (e.g., identification of visual elements, associated functions, I/O, and returned communication, etc.) to build code that can be executed to repeat the recorded operations and/or captured data flows. In some embodiments, the system is configured to process recording and translation in parallel so an end event or trigger is not necessary to execute translation.

In some embodiments, the back end is configured to map recorded operations into lines of code to execute the same function in a given test case. For example, a selection in a mobile device UI can be recorded and mapped into code by the backend. In further example, a user input (or captured communication stream) of a specific value can be mapped into code for selecting the visual element the user selected and code for input of the specific value. In various embodiments, the backend is configured to translate an execution recording into lines of code. As discussed, this can be based on recording a user's interactions or based on using a captured communication stream as a proxy for user input. For example, the system can be configured to create code for executing the same sequence performed on the system. In some embodiments, the system is configured to group or segment the sequence of code based on the functions being executed. In one example, the system can discover elements of the application or display and group the user's or captured actions and associated code based on the sequences that pertain to each element.

The terms "program" or "software" are used herein in a generic sense to refer to any type of computer code or set of processor-executable instructions that can be employed to program a computer or other processor to implement various aspects of embodiments as discussed above. Additionally, it should be appreciated that according to one aspect, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Also, various inventive concepts may be embodied as one or more processes, of which examples (e.g., the processes described herein) have been provided. The acts performed as part of each process may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, and/or ordinary meanings of the defined terms. As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B," when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing," "involving," and variations thereof, is meant to encompass the items listed thereafter and additional items.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

The invention claimed is:

1. A system for test automation, comprising:
at least one processor operatively connected to a memory, the at least one processor when executing configured to:
execute an existing test framework between a test platform and at least a first test service;
passively capture data traffic within and between the test platform and the at least the first test service;
mirror the captured data traffic to a proxy provider and automation platform;

enable native functions of the automation platform to operate on the captured data traffic;

manage a test framework native to the automation platform including the captured data traffic, the test framework including at least a plurality of executed tests, setup data required for the plurality of executed test, and results of the plurality of executed tests; and automatically construct additional tests based on validated candidate test constructs and an additional test target.

2. The system of claim 1, wherein the at least one processor is configured to validate the candidate test constructs communication and execution stacks based on the passively captured data traffic upon execution.

3. The system of claim 2, wherein the at least one processor is configured to validate a candidate test construct does not induce any additional execution or communication beyond the passively captured data traffic responsive to execution of the candidate test construct.

4. The system of claim 2, wherein the at least one processor is configured to automatically generate automated tests from manual execution tests and manual execution tests from automated tests to extend testing coverage of the existing test framework.

5. The system of claim 1, wherein the at least one processor is configured to instantiate a passive monitor in the test platform configured to capture execution stack information and communication stack information upon execution of the test framework.

6. The system of claim 5, wherein the passive monitor is configured to:
record all communication information in the communication stack and associate the communication information to tests under execution.

7. The system of claim 5, wherein the passive monitor is configured to:
record all execution information in the execution stack and associate the execution information to tests under execution.

8. The system of claim 7, wherein the passive monitor is configured to include operating system level interactions on the test platform during execution.

9. The system of claim 5, wherein the passive monitor is configured to mirror captured information to secure provider proxy.

10. The system of claim 9, wherein the passive monitor is configured to prevent any impact on the test platform in response to failure of the passive monitor.

11. A computer implement method for test automation, comprising:
executing, by at least one processor, an existing test framework between a test platform and at least a first test service;

passively capturing, by the at least one processor, data traffic within and between the test platform and the at least the first test service;

mirroring, by the at least one processor, the captured data traffic to a proxy provider and automation platform;

enabling, by the at least one processor, native functions of the automation platform to operate on the captured data traffic and manage a test framework native to the automation platform including the captured data traffic, the test framework including at least a plurality of executed tests, setup data required for the plurality of executed test, and results of the plurality of executed tests; and automatically constructing additional tests based on validated candidate test constructs and an additional test target.

12. The method of claim 11, wherein the method further comprises validating the candidate test constructs generate communication and execution stacks based on the passively captured data traffic upon execution.

13. The method of claim 12, wherein the method further comprises validating a candidate test construct does not induce any additional execution or communication beyond the passively captured data traffic responsive to execution of the candidate test construct.

14. The method claim 12, wherein the method further comprises automatically generating automated test cases from manual execution test cases and manual execution test cases from automated test cases to extend testing coverage of the existing test framework.

15. The method of claim 11, wherein the method further comprises instantiating a passive monitor in the test platform configured to capture execution stack information and communication stack information upon execution of the test framework.

16. The method of claim 15, wherein the method further comprises recording, by the passive monitor, targeted communication information in the communication stack and associating the communication information to tests under execution.

17. The method claim 16 wherein the method further comprises recording, by the passive monitor, targeted execution information in the execution stack and associating the execution information to tests under execution.

18. The method of claim 15, wherein the method further comprises preventing any impact on the test platform in response to failure of the passive monitor.

19. The method of claim 11, wherein the method further comprises:
analyzing the captured data traffic and test framework to determine a quality score for the test framework; and
identifying options for increasing the quality score.

* * * * *